(12) United States Patent
Horovitz

(10) Patent No.: US 11,526,578 B2
(45) Date of Patent: *Dec. 13, 2022

(54) SYSTEM AND METHOD FOR PRODUCING TRANSFERABLE, MODULAR WEB PAGES

(71) Applicant: Elementor Ltd., Beni Brak (IL)

(72) Inventor: Mati Horovitz, Bnei Brak (IL)

(73) Assignee: Elementor Ltd., Beni Brak (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/117,169

(22) Filed: Dec. 10, 2020

(65) Prior Publication Data
US 2022/0004700 A1 Jan. 6, 2022

Related U.S. Application Data

(63) Continuation of application No. 16/665,303, filed on Oct. 28, 2019, now Pat. No. 10,915,599.

(60) Provisional application No. 62/767,523, filed on Nov. 15, 2018.

(51) Int. Cl.
*G06F 17/00* (2019.01)
*G06F 16/958* (2019.01)
*G06F 3/04842* (2022.01)
*G06F 40/143* (2020.01)

(52) U.S. Cl.
CPC ........ *G06F 16/972* (2019.01); *G06F 3/04842* (2013.01); *G06F 16/986* (2019.01); *G06F 40/143* (2020.01)

(58) Field of Classification Search
CPC .. G06F 16/972; G06F 3/04842; G06F 16/986; G06F 40/143; G06F 16/958; G06F 8/00; G06F 8/20; G06F 8/34
See application file for complete search history.

(56) References Cited

U.S. PATENT DOCUMENTS

| | | | | |
|---|---|---|---|---|
| 8,627,195 | B1 * | 1/2014 | Hayden | G06F 16/957 |
| | | | | 715/229 |
| 9,098,472 | B2 * | 8/2015 | Bach | G06F 16/168 |
| 10,049,095 | B2 * | 8/2018 | Chiculita | G06F 40/186 |
| 2009/0144753 | A1 * | 6/2009 | Morris | G06F 40/169 |
| | | | | 719/318 |

(Continued)

OTHER PUBLICATIONS

Vuorimaa Petri et al: "Leveraging declarative languages in web application development", World Wide Web, Baltzer Science Publishers, Bussum, NL, vol. 19, No. 4, Apr. 2, 2015 (Apr. 2, 2015), pp. 519-543 XP035935965, ISSN: 1386-145X, DOI: 10.1007/S11280-015-0339-Z.

(Continued)

*Primary Examiner* — Hassan Mrabi
(74) *Attorney, Agent, or Firm* — The Roy Gross Law Firm, LLC; Roy Gross

(57) ABSTRACT

A system and method of producing a web page by at least one processor may include: receiving at least one web page component (WPC), associated with one or more WPC attributes; producing at least one first scheme, comprising a representation of the at least one WPC, in a unified scheme format; interpreting the at least one scheme to produce at least one second scheme, comprising a representation of one or more instantiations of WPCs in an interpreted format; and producing a web page comprising one or more instantiations of WPCs of the at least one second scheme.

21 Claims, 15 Drawing Sheets

(56) References Cited

U.S. PATENT DOCUMENTS

| | | | |
|---|---|---|---|
| 2013/0019189 A1* | 1/2013 | Stewart | G06F 16/958 715/760 |
| 2013/0104024 A1 | 4/2013 | Rajkumar et al. | |
| 2013/0187926 A1* | 7/2013 | Silverstein | G06F 16/285 345/440 |
| 2014/0181639 A1 | 6/2014 | Lund et al. | |
| 2014/0245125 A1* | 8/2014 | Ozgul | G06F 40/106 715/234 |
| 2016/0026611 A1* | 1/2016 | Liu | G06F 16/9577 715/234 |
| 2016/0103563 A1* | 4/2016 | Greenberg | H04L 67/22 715/738 |
| 2017/0075663 A1* | 3/2017 | Jordan | G06F 8/658 |
| 2017/0090734 A1 | 3/2017 | Fitzpatrick | |
| 2017/0193367 A1* | 7/2017 | Miikkulainen | G06F 16/2379 |
| 2019/0065444 A1* | 2/2019 | Sitaraman | G06F 16/972 |
| 2019/0095404 A1* | 3/2019 | Herreria | G06F 3/0482 |

OTHER PUBLICATIONS

Gellersen H-W et al: "WebComposition: an object-oriented support system for the Web engineering lifecycle", Computer Networks and ISDN Systems, North Holland Publishing. Amsterdam, NL, vol. 29, No. 8-13, Sep. 1, 1997 (Sep. 1, 1997), pp. 1429-1437, XP004095337, ISSN: 0169-7552, DOI: 10.1016/S0169-7552 (97)00038-X.
European Search Report of European Application No. EP19209261.7 dated Mar. 17, 2020.

\* cited by examiner

Scheme 30

| Heading S-WPC 310A | |
|---|---|
| Text | About Us |
| Font Size | 25px |
| Color | Black |

| Video S-WPC 310B | |
|---|---|
| Source | https://www.youtube.com/watch?v=6u45V2q1s4k |
| AutoPlay | True |
| Loop | False |

| Heading S-WPC 310C | |
|---|---|
| Text | Our Team |
| Font Size | 20px |
| Color | Gray |

| Gallery S-WPC 310D | |
|---|---|
| Images | https://domain.com/team/a.jpg, https://domain.com/team/b.jpg, https://domain.com/team/c.jpg, |
| Image Size | Medium |
| Columns | 2 |

| Form S-WPC 310E | |
|---|---|
| Fields | Email(type=email), Message (type=textarea) |
| Label Color | #eee |
| Submit Actions | Email Notification( to=webadmin&subject=Form Submitted ) |

Fig. 4

Page Scheme 30-A1 (source page default values)

S-WPC 310-A1 (e.g., first Heading defaults)

| | |
|---|---|
| Font Size | 25px |
| Color | Black |

S-WPC 310-B1 (e.g., Video defaults)

| | |
|---|---|
| AutoPlay | True |
| Loop | False |

S-WPC 310-D1 (e.g., Gallery defaults)

| | |
|---|---|
| Image Size | Medium |
| Columns | 2 |

S-WPC 310-E1 (e.g., Form defaults)

| | |
|---|---|
| Label Color | #eee |
| Submit Actions | Email Notification( to=webadmin&subject=Form Submitted ) |

Page Scheme 30-A2 (source page copy-enabled web elements)

S-WPC 310-A2 (e.g., first copy-enabled Heading element)

| | |
|---|---|
| Text | About Us |

S-WPC 310-B2 (e.g., copy-enabled Video element)

| | |
|---|---|
| Source | https://www.youtube.com/watch?v=6u45V2q1s4k |

S-WPC 310-C2 (e.g., second copy-enabled Heading element)

| | |
|---|---|
| Text | Our Team |
| Font Size | 20px |
| Color | Gray |

S-WPC 310-D2 (e.g., copy-enabled Gallery element)

| | |
|---|---|
| Images | https://domain.com/team/a.jpg, https://domain.com/team/b.jpg, https://domain.com/team/c.jpg, |

S-WPC 310-E2 (e.g., copy-enabled Form element)

| | |
|---|---|
| Fields | Email(type=email), Message (type=textarea) |

Page Scheme 30-B4 (e.g., target page default values)

S-WPC 310-A4 (e.g., first Heading defaults)

| | |
|---|---|
| Font Size | 12px |
| Color | Blue |

S-WPC 310-B4 (e.g., Video defaults)

| | |
|---|---|
| AutoPlay | False |
| Loop | True |

S-WPC 310-D4 (e.g., Gallery defaults)

| | |
|---|---|
| Image Size | Large |
| Columns | 3 |

S-WPC 310-E4 (e.g., Form defaults)

| | |
|---|---|
| Label Color | #aaa |
| Submit Actions | Save To DB |

Page Scheme 30-B5 (e.g., merged target scheme)

S-WPC 310-A5 (e.g., merged instantiation of first Heading element on target page)

| | |
|---|---|
| Text | About Us |
| Font Size | 12px |
| Color | Blue |

S-WPC 310-B5 (e.g., merged instantiation of Video element on target page)

| | |
|---|---|
| Source | https://www.youtube.com/watch?v=6u45V2q1s |
| AutoPlay | False |
| Loop | True |

S-WPC 310-C5 (e.g., merged instantiation of second Heading element on target page)

| | |
|---|---|
| Text | Our Team |
| Font Size | 12px |
| Color | Gray |

S-WPC 310-D5 (e.g., merged instantiation of Gallery element on target page)

| | |
|---|---|
| Images | https://domain.com/team/a.jpg, |
| Image Size | Large |
| Columns | 3 |

S-WPC 310-E5 (e.g., merged instantiation of Form element on target page)

| | |
|---|---|
| Fields | Email(type=email), Message (type=textarea) |
| Label Color | #aaa |
| Submit Actions | Save To DB |

Fig. 11

SYSTEM AND METHOD FOR PRODUCING TRANSFERABLE, MODULAR WEB PAGES

CROSS REFERENCE TO RELATED APPLICATIONS

The present application is a continuation of non-provisional application Ser. No. 16/665,303 filed Oct. 28, 2019 entitled "SYSTEM AND METHOD FOR PRODUCING TRANSFERABLE, MODULAR WEB PAGES", which in turn claims benefit from prior provisional application 62/767,523, filed on Nov. 15, 2018, both incorporated herein by reference in their entirety.

FIELD OF THE INVENTION

The present invention relates generally to production of internet web pages. More specifically, the present invention relates to production of modular, transferrable web pages.

BACKGROUND OF THE INVENTION

The production of web pages for various types and formats of browsing platforms is ubiquitous. Commercially available software platforms and open source tools enable web designers to produce new web pages using predefined templates and designs and to add proprietary content according to their specific requirements.

Web pages may include or refer to data that may be stored on a plurality of locations and may include data structures of different types. For example, web pages typically include or refer to data in one or more Hypertext Markup Language (HTML) files. This data may be styled by additional data stored in one or more Cascading Style Sheet (CSS) files and may also refer to operational code that may be stored on JavaScript files. The term web page may also refer to the visual display produced by a computer executing or following data defining a web page.

The term "web browser" may refer herein to a software module that may be adapted to present a web page on a display (e.g., a monitor) of a computing device such as a mobile or desktop computing device. Additionally, or alternatively, a web browser may render and/or interact with at least one element of a web page, with or without a monitor. For example, the web browser may render a web page so as to produce at least one data element (e.g., a bitmap image) that may be presented on a display of a computing device.

The term "web page" may be used herein to refer to a document, such as a computer file, that may be suitable for transferal among computing devices of a computing network, such as the World Wide Web (WWW) and may be displayed, rendered and/or interacted with via a web browser. Alternatively, the term "web page" may refer to both a displayed content (e.g., that may be displayed on a monitor device) and to a computer file, in HTML or a comparable markup language.

The plurality of storage locations and formats of data that may be included in a web page or an element thereof may impede convenient transfer or migration (e.g., copying and pasting) of web page components from one web page to another. This impedance is particularly felt by web designers who may be forced to extract all the information relating to a specific web page component (e.g., HTML, stylesheets, JavaScript code, server-side code, etc.) before migrating the web page component to a new web page.

SUMMARY OF THE INVENTION

Embodiments include systems and methods for streamlined creation of modular, transferrable web page components and web pages.

According to some embodiments, a method of producing modular web pages by at least one processor may include receiving a definitions set, including one or more definitions of web page components, each definition associating a web page component with a respective appropriate format and with one or more respective attributes; producing a scheme, including one or more instantiations of web page components according to the definitions set, in a unified scheme format; interpreting the unified scheme format of one or more instantiations of web page components in the scheme to a respective appropriate format; and producing a web page according to the interpretation of one or more instantiations of web page components of the scheme.

Embodiments of the method may include representing at least one web page component of the definitions set as a selectable object on a user interface (UI); enabling selection by a user, of at least one selectable object, and location of the object on a preview region of the UI; and modifying or updating the scheme by the scheme editor, to include an instantiation of the web page component represented by the selected object, in the unified scheme format, according to at least one of: the location of the at least one selected object on the preview region, and at least one attribute of the respective web page component.

Embodiments of the method may include presenting the one or more web page components on the preview region of the UI, according to at least one of: the one or more web page components' interpreted appropriate formats; the web page components' respective attributes; and the location of respective objects on the preview region of the UI.

Embodiments of the method may include presenting the web page on a web browser, according to at least one of: the WPCs' interpreted appropriate formats; the WPCs' respective attributes; and the location of respective objects on the preview region of the UI.

Embodiments of the method may include: displaying one or more attributes associated with at least one web page component of the definitions set on an editing region of the UI; enabling a user to edit at least one attribute of the at least one web page component; and updating the scheme, to include an instantiation of a web page component according to the at least one edited attribute.

Embodiments of the method may include receiving a definitions set, including one or more first definitions of web page components, wherein each first web page component may be associated with one or more first respective attributes; producing a second web page component, associated with one or more second respective attributes, wherein the one or more second attributes include the one or more first attributes; and producing a scheme, including one or more instantiations of the second web page component, in a unified scheme format.

Embodiments of the method may include assigning a copy enablement attribute to at least one web page component; producing a source scheme, including an instantiation of the at least one copy-enabled web page component; producing a source web page according to the interpretation of one or more instantiations of web page components of the source scheme; embedding the copy enablement attribute of the at least one web page component within the source web page; and embedding the scheme, or a reference thereto within the source web page.

Embodiments of the method may include importing at least one source web page including at least one copy enabled web page component and a respective at least one source scheme to a computing device; recognizing a copy action of a copy enabled web page component from the source web page; and storing the content of the embedded source scheme in a memory associated with the computing device.

Embodiments of the method may include producing a target web page, and a respective target scheme on the UI; identifying a user's paste action of a source scheme onto the UI; updating the target scheme to include data of the source scheme; interpreting the unified scheme format of the updated target scheme; and producing a target web page according to the interpretation of the updated target scheme.

Embodiments of the invention may include a method of producing a web page by at least one processor. Embodiments of the method may include: receiving at least one WPC, associated with one or more WPC attributes; producing at least one first scheme, may include a representation of the at least one WPC, in a unified scheme format; interpreting the at least one scheme to produce at least one second scheme, may include a representation of one or more instantiations of WPCs in an interpreted format; and producing a web page that may include one or more instantiations of WPCs of the at least one second scheme.

According to some embodiments, the produced web page may be a modular web page. The modular web page may include an embedded reference to the at least one first scheme.

According to some embodiments, at least one WPC instantiation may be associated with one or more first instruction code elements (e.g., elements 311A, 311B, 311C, 311D of FIG. 2), each having a respective, original instruction code format (e.g., a server instruction format, a JavaScript format, a CSS format, an HTML format and the like). The unified scheme format may include a single, second instruction code element having a single instruction code format. The second instruction code element may include an aggregation or collection of information pertaining to the one or more first instruction code elements.

Embodiments of the present invention may include: receiving at least one WPC definition associating at least one WPC with one or more WPC attributes; representing the at least one WPC definition as a selectable object on a UI; receiving from the UI a first selection of at least one selectable object; and updating the at least one first scheme, to include a representation of an instantiation of the WPC represented by the selected object, in the unified scheme format.

Embodiments of the present invention may include: presenting an instantiation of the WPC on the UI; receiving from the UI a second selection pertaining to a location of the instantiation of the WPC on the UI; and updating the at least one first scheme, to comprise a representation of the instantiation of the WPC according to the third selection, in the unified scheme format.

Embodiments of the present invention may include: displaying and/or rendering at least one WPC attribute of at least one instantiation of a WPC on the UI; receiving, from the UI, a third selection pertaining to modification of a value of the at least one WPC attribute; and updating the at least one first scheme, to comprise a representation of the instantiation of the WPC according to the third selection, in the unified scheme format.

Embodiments of the present invention may include: rendering and/or presenting, on the UI, a modular web page. The modular web page may include one or more instantiations of WPCs in an interpreted format, corresponding to the at least one second, interpreted scheme.

According to some embodiments of the invention, interpreting the at least one scheme may include disaggregating the second instruction code element to produce at least one WPC in an interpreted format (e.g., element I-WPC 51 of FIG. 2). The at least one WPC in the interpreted format may include the one or more first instruction code elements (e.g., elements 51A through 51G as elaborated herein), wherein each of the first instruction code elements has the respective, original instruction code format (e.g., JavaScript, CSS, HTML, Java, Python, and the like).

Additionally, or alternatively, interpreting the at least one scheme may include: obtaining a plurality of WPC attributes, associated with one or more WPCs of the one or more first schemes; arbitrating among the plurality of WPC attributes to select at least one WPC attribute; and producing an interpreted scheme (e.g., element I-WPC 51 of FIG. 2) that may include at least one instantiation of a WPC that may be associated with the selected at least one WPC attribute.

According to some embodiments of the invention, the plurality of WPC attributes may include, for example, a first WPC attribute of a first WPC of the one or more first schemes and second WPC attribute of a second WPC of the one or more first schemes. The interpreted scheme may include at least one instantiation of a WPC that may be associated with the first WPC attribute and with the second WPC attribute. For example, the interpreted scheme may include attributes having values that may be a combination of the attributes of the first WPC and the second WPC.

According to some embodiments of the invention, interpreting the at least one scheme may include: producing at least one WPC in an interpreted format; and producing at least one instruction code element associated with the WPC. The at least one instruction code element may be an operational server code element that may be adapted for a specific server computing device.

According to some embodiments of the invention, at least one WPC attribute of at least one WPC of the at least one first scheme may be a dynamic WPC attribute. Interpreting the at least one scheme may include: producing a WPC in an interpreted format; associating the WPC with the dynamic WPC attribute; and assigning a dynamic value to the dynamic WPC attribute.

Embodiments of the present invention may include: obtaining a source web page may include an instantiation of at least one source WPC; presenting the source web page on a UI; detecting a copy action corresponding to at least one source WPC on the UI; and storing at least one embedded source scheme that corresponds to the at least one copied source WPC in a memory location that may be associated with the UI. The at least one embedded reference to the source scheme may include one or more code elements pertaining to the at least one copied source WPC, e.g., in a unified scheme format.

According to some embodiments of the invention, the instantiation of the at least one source WPC may be associated with a copy-enablement WPC attribute and storing the at least one embedded reference to the source scheme may be done according to a value of the copy-enablement WPC attribute (e.g., storing may be enabled only if a value of the copy-enablement WPC attribute is 'true').

Embodiments of the present invention may include: presenting, on the UI, a target web page associated with at least one target scheme in a unified scheme format; detecting a paste action corresponding to the at least one source WPC on the UI; retrieving the at least one source scheme from the memory location; updating the at least one target scheme to comprise one or more code elements of the retrieved at least one source scheme; and interpreting the unified scheme format of the updated target scheme to produce an updated target web page, may include an instantiation of the copied source WPC.

Embodiments of the present invention may obtain a source web page by: producing at least one copy instruction code element (e.g., element MG of FIG. 9A); producing a first scheme in the unified scheme format, where the first scheme may include a representation of an instantiation of the at least one WPC and further may include the copy instruction code element; interpreting the first scheme to produce a second scheme that may include a representation an instantiations of the at least one WPC in an interpreted format; and producing a source web page that may include an instantiation of the at least one WPC and the respective copy instruction code element.

According to some embodiments of the invention, the WPC may include, for example: heading object, a text object, a form object, an image object, an image gallery object, a video object and a table object. It may be appreciated by a person skilled in the art that additional web page components may also be included.

According to some embodiments of the invention, the WPC attributes may include, for example: a color, a size, a location on a web page, a font, a font size, an identification number, a predetermined function attribute and a copy-enablement attribute. It may be appreciated by a person skilled in the art that additional web page components attributes may also be included.

Embodiments of the invention may include a system for producing a web page. Embodiments of the system may include: a non-transitory memory device, where modules of instruction code may be stored and a processor associated with the memory device and configured to execute the modules of instruction code. Upon execution of the modules of instruction code, the processor may be configured to: receive a definitions set, may include one or more definitions of WPCs, each definition associating a WPC with one or more WPC attributes; produce at least one first scheme, may include a representation of one or more instantiations of WPCs according to the definitions set, in a unified scheme format; interpret the at least one scheme to produce at least one second scheme, may include a representation of one or more instantiations of WPCs in an interpreted format; and produce a modular web page may include one or more instantiations of WPCs of the at least one second scheme.

Embodiments of the invention may include a method of producing a web page by at least one processor. Embodiments of the method may include: receiving a source web page, may include one or more WPCs and one or more embedded references to at least one first scheme element in a unified scheme format; detecting a copy action pertaining to a WPC of the source web page; detecting a paste action pertaining to the copied WPC; interpreting the at least one scheme element to produce at least one second scheme element, may include a representation of an instantiation of the WPC in an interpreted format; and producing a target web page may include an instantiation of the pasted WPC of the second scheme.

It may be appreciated by a person skilled in the art that the source web page may be associated with or belong to a first web domain, and the target web page may be associated with or belong to a second, different web domain.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4 is a block diagram, depicting an example of a scheme instantiation, that may be used by a system for creation of modular web pages, according to some embodiments;

FIG. 11, is a block diagram depicting an example of merging between instantiations of web page components;

Figure 1:
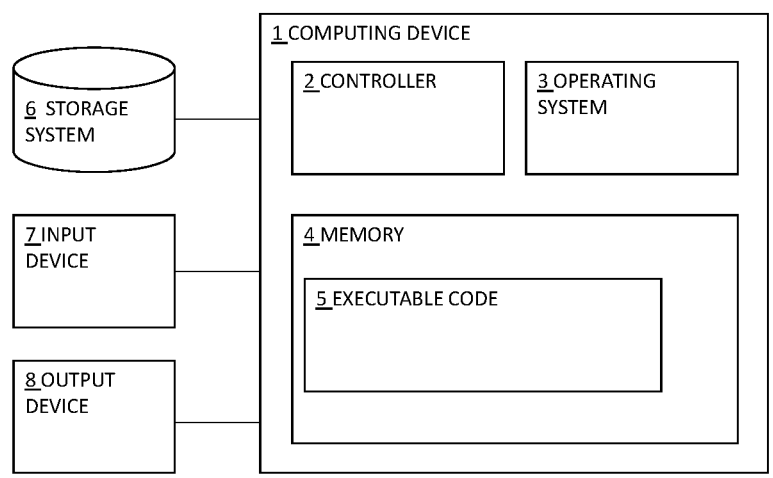
FIG. 1 is a block diagram, depicting a computing device, that may be included in a system for creation of modular web pages, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. A non-transitory memory device may store code or instructions which when executed by a processor cause the processor to perform or configure the processor to perform methods as disclosed herein. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention may include a method and a system for generating or producing transferrable, modular web pages. Embodiments of the present invention include an improvement over commercially available technology by providing methods for creating web pages that may include modules of web page components (WPCs), each being encapsulated (e.g., including all the information required to present and/or execute the WPC) and transferrable (e.g., by basic copy and paste actions) between different web pages and/or among different computing systems, as elaborated herein.

Furthermore, embodiments of the present invention may provide methods for integrating between different web page components in a streamlined manner. For example, embodiments may enable users to copy (e.g., by simply pressing the Control+'C.' buttons) a WPC (e.g., including all the information required to present, interact with and/or execute the WPC) from a source web page having a first set of default definitions, and paste (e.g., by simply pressing the Control+'V' buttons) the WPC onto a target web page, having a second set of default definitions, so as to implement the second set of default definitions on the presentation and/or functionality of the pasted WPC, as elaborated herein.

Additionally, or alternatively, embodiments may obtain data relating to dynamic WPC fields and generate or produce at least one web page component dynamically, according to the obtained data, to further streamline the integration of imported WPCs from a source web page to a target web page, as elaborated herein. The term "dynamic" may refer, in this context, to a field or parameter that may define a property of a WPC, and of which the value or content may be dynamically configured (e.g., by a user and/or a standard data structure, as explained herein), rather than being preset at the time of creating the web page.

Reference is now made to FIG. 1, which is a block diagram depicting a computing device, which may be included within an embodiment of a system for generating or producing modular web pages, according to some embodiments.

Computing device 1 may include a controller 2 that may be, for example, a central processing unit (CPU) processor, a chip or any suitable computing or computational device, an operating system 3, a memory 4, executable code 5, a storage system 6, input devices 7 and output devices 8. Controller 2 (or one or more controllers or processors, possibly across multiple units or devices) may be configured to carry out methods described herein, and/or to execute or act as the various modules, units, etc. More than one computing device 1 may be included in, and one or more computing devices 100 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM.

Executable code 5 may be any executable code, e.g., an application, a program, a process, task or script. Executable code 5 may be executed by controller 2 possibly under control of operating system 3. For example, executable code 5 may be an application that may generate or produce modular web pages as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 6 and may be loaded from storage system 6 into memory 120 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

The following Table 1 may serve as a reference for terms that are used herein.

TABLE 1

| | |
|---|---|
| Web page | The term "web page" may be used herein to refer to a data structure that may be rendered, presented and/or displayed by at least one web browser and may include one or more web page components. Embodiment of the invention may be adapted to produce at least one modular, transferrable web page or a section (e.g., one or more web page components) thereof. A web page may also refer to the visual representation and/or graphical user interface of the web page data structure when interpreted by a web browser. |
| Web page component (WPC) | The term "web page component" (WPC) may be used herein to refer to at least one element that may be included in a web page, including for example: a heading, a section of text, an image, a video, and the like. It is to be noted that data pertaining to a specific WPC may be manifested in a plurality of formats or data structures, according to the different modules that may be included in embodiments of the present invention. The term WPC may thus further refer to different manifestations of the same data, according to the respective context. The term WPC may refer to the data describing a WPC and also such a component when displayed to a user on a monitor, e.g. after being interpreted by a web browser. |
| Web page component format | The term 'format', "WPC format" or "instruction code format" may be used herein interchangeably to refer to at least one format of a data structure that may be associated with a WPC. For example, a WPC may be associated with a plurality of instruction code elements that may be used to instantiate or describe different aspects of the WPC. Each of the plurality of instruction code elements may have its own respective formats (e.g. HTML, JavaScript, CSS, etc.). |
| Web page component attribute | The term "WPC attribute" may be used herein to refer to at least one characteristic of an instantiation of a WPC, including for example: a color, a font, a font size, a size, a location on a web page, an identification number (ID), a predetermined function attribute (e.g., a hyperlink adapted to direct a user to a predefined address), a copy-enablement attribute (as elaborated herein) and the like. "Attribute" may refer to the attribute as displayed (e.g. a displayed font size) and the data representing the attribute. |
| Scheme | The terms "scheme" and "WPC scheme" may be used herein interchangeably, to refer to a data structure that may include an instantiation and/or a description of one or more WPCs, in a unified scheme format. For example, as known in the art, a WPC may be defined or described by a plurality of instruction code elements (e.g., HTML, JavaScript and CSS code elements), each having a proprietary format or syntax (e.g., an HTML syntax, a JavaScript syntax and a CSS syntax, respectively). A WPC scheme may include a single instruction code element that may define or describe the WPC in a single, or unified format, that may include all the information of the plurality of instruction code elements, as explained herein. |
| Server code, server-side instructions | The terms "server code" and "server-side instructions" may be used herein interchangeably to refer to any aspect of a server behavior that may be included in a web page, as known in the art. For example: server code may include instructions in a software language (e.g., JavaScript) that may be adapted to configure a server to perform a specific action according to the instructions therein. In another example, server code may include descriptive text segments and/or keywords that may, for example be presented to the server (e.g., "Send-email-to-administrator") and may be parsed by the server to produce the required operational server code to facilitate the required action (e.g., Java code for sending the required email). |

Figure 2:
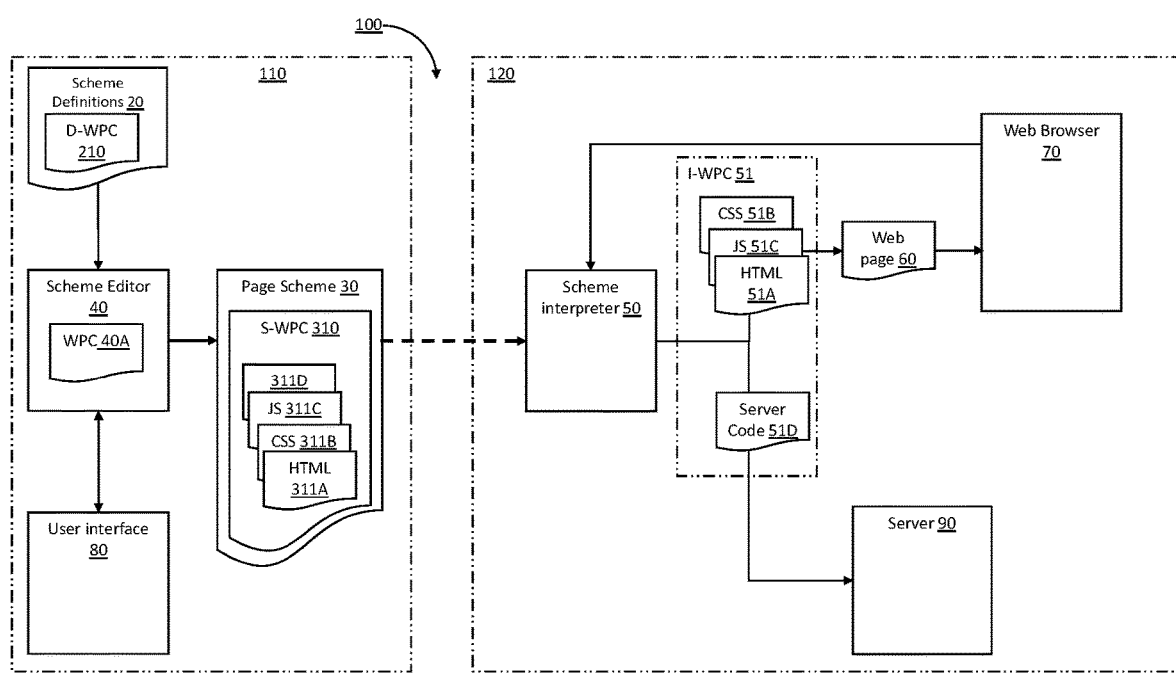
FIG. 2 is a block diagram, depicting a system for creation of modular web pages, according to some embodiments.

Reference is now made to FIG. 2, which is a block diagram, depicting a system 100 for creation of transferrable, modular web pages, according to some embodiments.

The term "modular" may be used herein in this context to refer to the inclusion of one or more WPCs as modules in the created web pages. For example, each WPC may relate to one or more presentable elements or modules (e.g., a text section, a form, an image, etc.) on the web page, and may include at least one of the presentable module or element's attributes (e.g., a color, a font, a location on a web page, a functionality, etc.).

The term "transferrable" may be used herein in relation to WPCs, to refer to a property of transferability of the WPCs among web pages. For example, embodiments of the invention may be adapted, as explained herein, to enable a user (e.g., a web designer) to: (a) select (e.g., by clicking a mouse-button) a WPC that may be included in a source web page; (b) copy (e.g., by pressing the Control+'C.' buttons) the selected WPC, including all the appearance and functionality information associated with the WPC (e.g., information that may be included in the WPC's instruction code elements, such as HTML code elements, JavaScript code elements, CSS code elements and server-side instructions); and (c) paste (e.g., by pressing the Control+'V' buttons) the copied WPC onto a target web page, to present and/or execute functions of the pasted WPC on the target web page according to the copied appearance and functionality information.

As explained herein, the term WPC may refer to one or more modules, sections or parts of a web page. Embodiments of the invention may process the data pertaining to or included in one or more WPCs in one or more stages or manifestations. This data included in the one or more WPCs may therefore be referred to as WPC, D-WPC, S-WPC, I-WPC etc., according to the context as explained herein.

As shown in FIG. 2, system 100 may include a first part (e.g., 110) that may be adapted to produce one or more schemes 30 that may include one or more WPCs (e.g., element 40A) of a web page (e.g., text boxes, images and the like) in a unified scheme format (S-WPC 310), as elaborated herein. System 100 may further include a second part (e.g., 120) that may interpret scheme 30, as elaborated herein, so as to produce at least one modular web page 60 and/or an element of instruction code such as a server instruction code element 51D, that may be adapted to be presented and/or executed on a specific server 90 and/or web browser 70. Elements 110 and 120 may include or may be implemented as one or more software modules and may be executed or processed by one or more computing devices (e.g., element 1 of FIG. 1). For example, elements 110 and 120 may be implemented as software processes that may be executed or implemented by one or more processors (e.g., element 2 of FIG. 1) of the same computing device (e.g., element 1 of FIG. 1). Alternatively, elements 110 and 120 may be implemented as software processes that may be executed or implemented by processors (e.g., element 2 of FIG. 1) of different, communicatively connected computing device (e.g., element 1 of FIG. 1).

According to some embodiments, system 100 may include a user interface (UI) 80 that may be adapted to enable a user to design and/or present at least one web page, including at least one WPC 40A. Additionally, or alternatively, system 100 may receive at least one WPC 40A from an external source (e.g., UI 80, a computing device such as element 1 of FIG. 1, a web browser 70, and the like).

Figure 5:
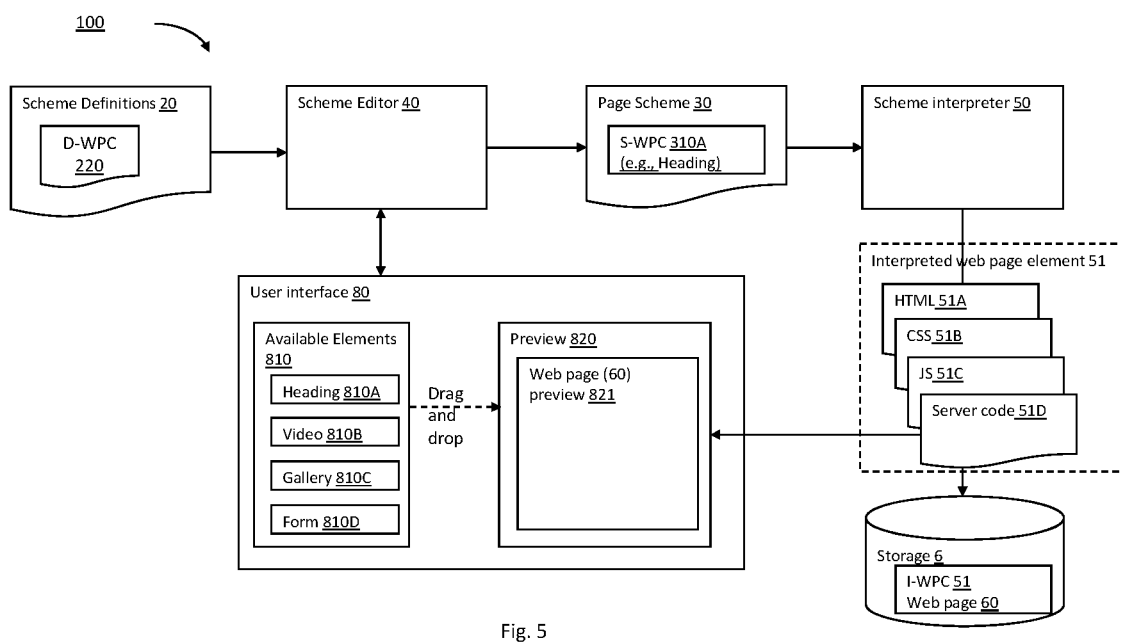
FIG. 5 is a block diagram, depicting a system for creation of modular web pages, according to some embodiments.

According to some embodiments of the invention, UI 80 may include or be produced by a web browser that may, in turn, include a preview display area (e.g., element 820 of FIG. 5). The preview display area may be configured to display a preview of a web page, including one or more WPCs (e.g., text, images, videos, etc.).

UI 80 may be configured to facilitate actions of web page design by a user as elaborated herein. Such web page design actions may include, for example: dragging a graphical element (e.g., an icon) representing a WPC across a display area, dropping a graphical element (e.g., an icon) representing a WPC in a selected location in the display area, selecting and changing at least one attribute (e.g., size, location, color, etc.) of at least one WPC, etc.

According to some embodiments, system 100 may receive a scheme definitions set 20, that may include one or more definitions of WPCs (hereinafter D-WPC), as elaborated herein (e.g., in relation to FIG. 3).

Scheme definitions set 20 may associate one or more WPC with one or more respective appropriate WPC formats and/or with one or more respective attributes.

For example, scheme definitions set 20 may include a first definition D-WPC 210 of a first WPC (e.g., a heading on a web page), associated with at least one code element in a first format (e.g. an HTML code and a CSS code) and with at least one attribute (e.g., a size and a font of the heading element, which may be described by the HTML and CSS code elements). In addition, scheme definitions set 20 may further include a second definition D-WPC 210 of a second WPC (e.g., an action button), associated with at least one second code element of a second format (e.g. a JavaScript code segment, defining an action that may be associated with clicking on the action button).

Scheme definitions set 20 may be implemented as any appropriate data structure, such as an entry in a relational database that may include one or more interlinked database tables. Scheme definitions set 20 may be stored on one or more storage devices (e.g. element 6 of FIG. 1) that may be associated with (e.g., communicatively connected to) or included in system 100. The structure of the scheme definitions set 20 is further discussed herein (e.g., in relation to FIG. 3).

System 100 may include an editor module, or a scheme editor module 40, associated with UI 80. Editor module 40 may be configured to produce or alter a scheme 30, that may include one or more instantiations of WPCs according to the definitions set, in a unified scheme format (hereinafter S-WPCs).

For example, a user may utilize UI 80 to produce a WPC (e.g. an action button), as elaborated herein. The WPC (e.g., the action button) may have specific WPC attributes (e.g., font size, associated action, etc.). The WPC attributes may be defined by a plurality of files or code elements in a plurality of formats, as known to persons skilled in the art. For example, an appearance of the button may be defined in an HTML code element, a styling of the button may be defined by a CSS code element and an action associated with the button (e.g., sending an email to a server computer) may be defined by a JavaScript code element. Editor module 40 may be configured to produce a scheme 30 that may include an instantiation of the at least one WPC (e.g. representing the action button), in a common, unified scheme format S-WPC 310, as elaborated herein.

The common scheme format (e.g., S-WPC 310) may be referred to as a 'unified' scheme format in a sense that it may include a single data element in a single format or code syntax and may hold information or data that pertains to a plurality of code elements, having an original respective plurality of formats and/or code syntaxes.

For example, the common, unified scheme format S-WPC 310 may include or may be implemented as a code element in an HTML code format. The scheme code element 310 may include: (a) HTML code 311A pertaining to the WPC (e.g., representing structural information pertaining to the WPC produced by the user), and (b) embedded, non-HTML code elements and/or links, references or pointers to non-HTML code elements (e.g., 311B, 311C) pertaining to the WPC. The non-HTML code elements may include, for example, CSS code elements (e.g., 311B, pertaining to a style of the WPC produced by the user) and/or JavaScript code elements (e.g., 311C, pertaining to a functionality of the WPC produced by the user). In another example, the non-HTML code elements may include, for example, a server instruction or a server code element (e.g., 311D).

As elaborated herein (e.g., in relation to FIG. 5), server instruction or a server code element 311D may include server code in any appropriate syntax or language to perform at least one action on a computing device such as server 90. Additionally, or alternatively, interpreter 50 may be configured to interpret server code element 311D produce a server code element 50D in an interpreted format, e.g., in an operational code syntax that may be utilized by server 90. In another example, Additionally, or alternatively, server instruction or server code element 311D may include an instruction (e.g., presented as a keyword, such as "send-email-to-administrator"), and server 90 may be configured to parse or translate the instruction to produce operational code element 51D in an appropriate interpreted format or syntax, to facilitate the required instruction (e.g., send the email to the required account).

It may be appreciated by a person skilled in the art that embodiments of the invention may include additional implementations of the unified scheme format. For example, the scheme code element 310 may include or may be implemented as a code element in any other appropriate format (e.g., other than HTML) as known in the art.

For example, an S-WPC 310 representing an action button may be defined by a single unified, transferrable HTML code element 310. The unified, transferrable HTML S-WPC 310 element may include for example the appearance of the button (e.g., in HTML code 311A); the styling of the button (e.g., as embedded CSS code 311B within the HTML element 310, or included as a pointer within the HTML element 310); and the functionality of the button (e.g., as embedded JavaScript code 311C within the HTML element 310, or included as a pointer within the HTML element 310).

According to some embodiments, system 100 may include a scheme interpreter 50. Interpreter 50 may be configured to receive (e.g., from scheme editor 40) a scheme 30, that may include one or more instantiations of WPCs (in the common, unified scheme format, e.g., S-WPC 310). Interpreter 50 may interpret, convert or translate the one or more instantiations of S-WPCs (e.g., S-WPC 310) to reproduce respective one or more interpreted WPCs (hereinafter I-WPC, e.g., I-WPC 51) that may include one or more code elements (e.g., 51A, 51B, 51C) in an appropriate format.

As shown in FIG. 2, embodiments of the invention include: (a) a collection or aggregation of WPC data (e.g., pertaining to different formats and storage locations of WPC code elements); (b) representation of the aggregated data in a unified format on a source side (e.g., 110); and (c) interpretation of the aggregated data on a target side (e.g., 120). It may be appreciated by a person skilled in the art that this configuration may enable embodiments of the invention to produce a web page that may be (a) independent of storage location, browser type and computing device; and (b) modular, in a sense that specific WPCs may be transferrable (e.g., by 'copy' and 'paste' operations) among web pages.

The term "interpretation" may indicate, in this context, that interpreter 50 may change or interpret the one or more S-WPC elements to produce one or more respective I-WPC elements in an appropriate format, according to a specific scenario and/or a specific function of an embodiment of the invention, as elaborated herein.

For example, as elaborated herein, scheme 30 may include a single instruction code element (e.g., S-WPC element 310) in a unified scheme format (e.g., in an HTML format). single instruction code element 310 may include an aggregation or collection of information pertaining to a plurality of instruction code elements (e.g., 311A, 311B, 311C) interpreter 50 may interpret instruction code element S-WPC 310, to produce an interpreted representation (e.g., I-WPC) of the WPC that may include one or more disaggregated code elements 51 (e.g., elements 51A, 51B, 51C, 51D). The one or more code elements 51 may, for example, be adapted to a specific web page, a specific web browser and/or a specific computing device (e.g., a web server).

In another example, interpreter 50 may interpret S-WPC 310, to produce I-WPC 51 that may include an arbitration or selection of characteristics, attributes or properties of a plurality of WPCs. For example, embodiments of the invention may receive (e.g., from a user of UI 80) a selection to copy at least one WPC (e.g., a text box) from a first (e.g., a source) web page and paste the WPC on a second (e.g., a target) web page as elaborated herein (e.g., in relation to FIG. 10 and FIG. 11). Interpreter 50 may be configured to select or arbitrate, for example, which of the attributes (e.g., a font type) of the copied WPC should be maintained in the target web page and which should be replaced with values (e.g., default values) of the target web page (e.g., a default background color).

Figure 10:
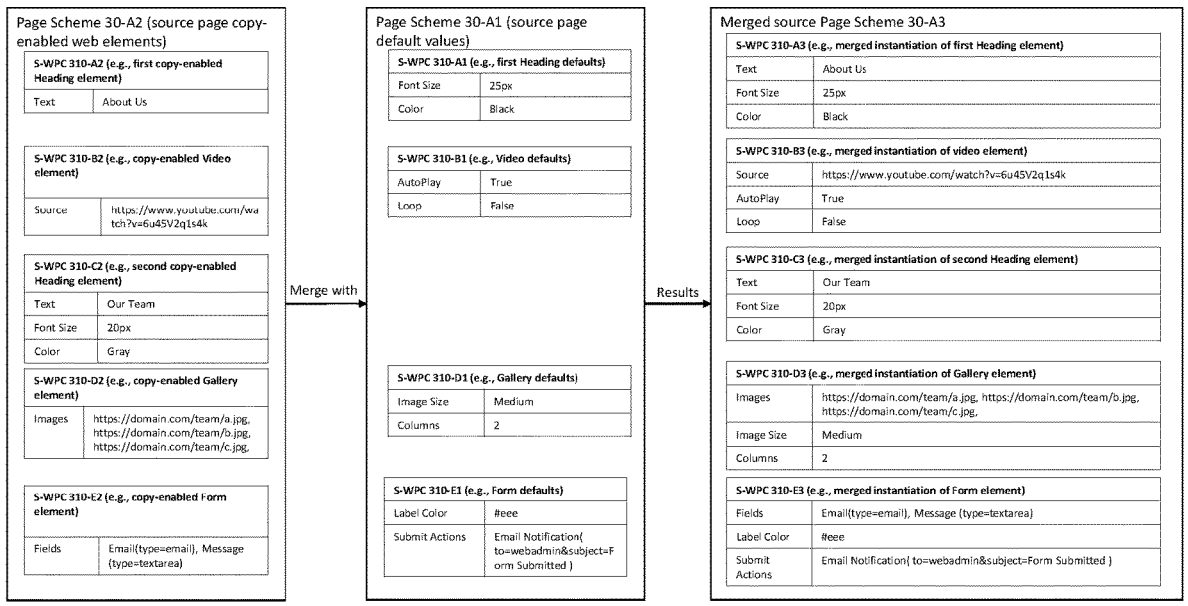
FIG. 10, is a block diagram depicting an example of merging between instantiations of web page components.

In another example, interpreter 50 may interpret S-WPC 310, to produce an I-WPC that may include a combination, or a merge of characteristics, attributes or properties of a plurality of WPCs, as elaborated herein (e.g., in relation to FIG. 10 and FIG. 11).

In another example, interpreter 50 may interpret S-WPC 310, to produce an I-WPC that may include server instructions (e.g., element 51D) that may be adapted to a specific server. In some embodiments of the invention, server code element 51D may include server instructions in a human language keyword format (e.g., "send-mail-to-administrator") and server 90 may be configured to parse the instruction to produce therefrom operational server code (e.g., in an appropriate code format such as Java, PHP and the like) so as to facilitate the instruction (e.g., send the required email to the administrator). Additionally, or alternatively, interpreter 50 may be adapted to interpret S-WPC 310 for a specific server 90 or a type of server 90. Interpreter 50 may produce an I-WPC that may include server code element 51D that may be adapted for server 90 and may include operational server code (e.g., in Java). Interpreter 50 may forward element 51D to server 90 to facilitate the required action (e.g., send the email). Additionally, or alternatively, interpreter 50 may receive an indication of a triggering action (e.g., a user clicking a "send email" button) from web browser 70 and may consequently produce server instruction or operational server code 51D for server 90.

Figure 12:
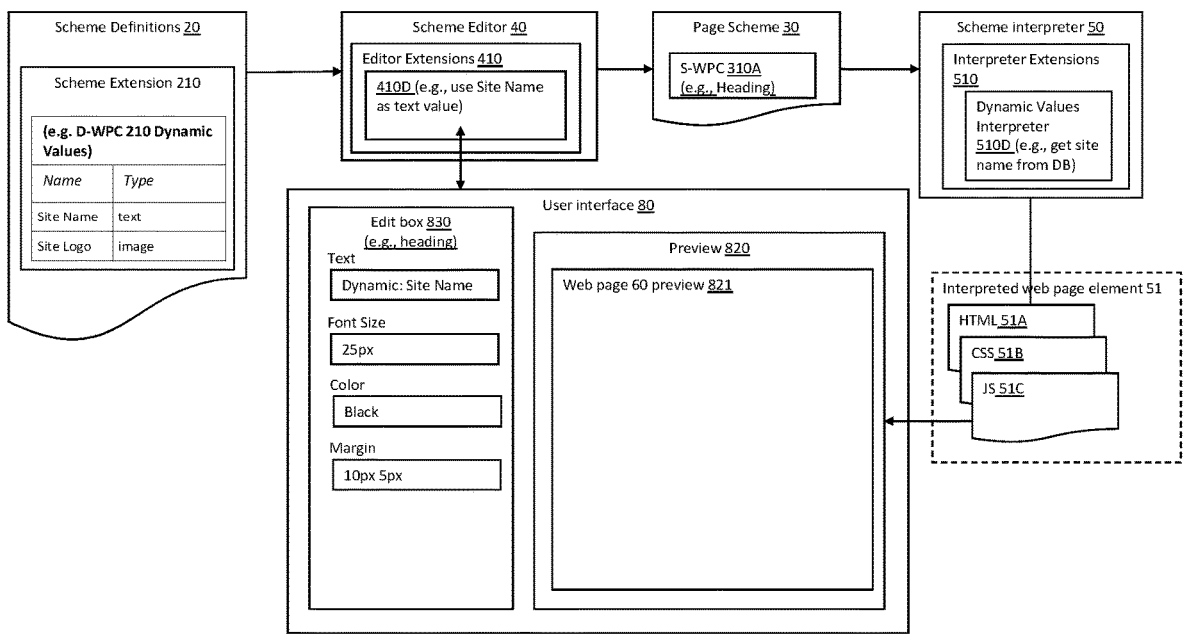
FIG. 12 is a block diagram, depicting a system for creation of modular web pages, according to some embodiments.
Figure 13:
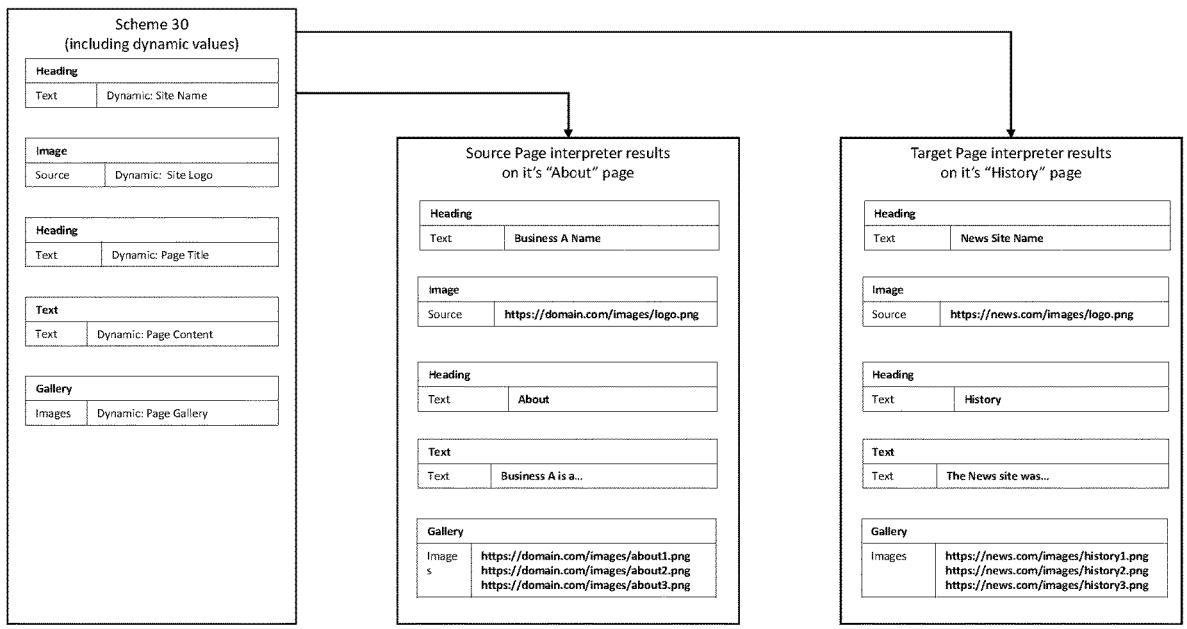
FIG. 13 is a block diagram, depicting an example of a scheme including a plurality of dynamic fields according to some embodiments.

In yet another example, interpreter 50 may interpret a S-WPC 310, to produce an I-WPC that may include a required value of one or more dynamic values (e.g., element D-WPC 210 of FIG. 12), as elaborated herein (e.g., in relation to FIG. 12 and FIG. 13).

The one or more interpreted or reproduced code elements (e.g., 51A, 51B, 51C) may manifest or cause to be rendered and/or displayed (e.g. when executed by a web browser) a reproduction of the web page component as was designed by a user (e.g., of user interface 80) and introduced to scheme editor 40.

Pertaining to the same example of the action button above, the interpreted web page component may include, for example: (a) a first code element 51A, e.g., in HTML syntax that may define the appearance of the action button on a web page; (b) a second code element 51B, e.g., in CSS syntax that may define the styling of the action button on a web page; (c) a third code element 51C, e.g., in JavaScript syntax that may define the functionality of the action button on a web page; and (d) a fourth code element 51D in an appropriate format (e.g., JavaScript) that may define a functionality of the action button on a server computer (e.g., send an email to a predefined address, as known in the art).

As shown in FIG. 2, the one or more interpreted WPCs (e.g., I-WPC 51) may be, or may be included within a web page 60. For example, the one or more interpreted WPCs I-WPC 51 may be or may include web page components such as text objects, images, videos, etc., as defined by the one or more code elements (e.g., 51A, 51B, 51C). Web page 60 may include these web page components, and may be rendered, displayed, presented and/or executed (e.g., by a web browser 70).

Additionally, or alternatively, I-WPCs 51 may be or may include at least one element of instruction code (e.g., server instruction or server code 51D) and may be employed by one or more computing devices, such as server 90 to perform computational processes (e.g., server-side actions) thereon.

Pertaining to the example above, interpreter 50 may interpret at least one scheme-WPC (e.g., S-WPC 310) of scheme 30 to extract or produce at least one interpreted WPC (e.g., I-WPC 51). The interpreted WPC may include at least one code element in at least one respective format, including for example: an HTML code element 51A in an HTML syntax, a CSS code element 51B in a CSS syntax and a JavaScript code element 51C in a JavaScript syntax. The at least one code element may be associated with the at least one WPC (e.g., action button) from or according to the common, unified scheme format. Interpreter 50 may reconstruct or interpret the WPC produced by the user on UI 80, to produce at least one I-WPC (e.g., I-WPC 51).

It may be appreciated by a person skilled in the art that the formatting of one or more WPCs 310 in a common scheme format by element 110 and the subsequent interpretation of the common scheme format of the one or more WPCs 310 by element 120 may be viewed as an abstraction of the one or more WPCs 310, and may thus provide an improvement over commercially available systems and methods for designing web pages, as elaborated in the examples included herein.

According to some embodiments, interpreter 50 may produce a web page 60, that may be or may include at least one interpreted web page component (I-WPC) according to interpretation of one or more instantiations of the scheme web page components of the scheme (e.g. S-WPC 310). Web page 60 may subsequently be rendered by and/or displayed or presented on a web browser 70. For example, web browser 70 may be adapted to execute or interpret the content of web page 60 on a computing device (e.g., element 1 of FIG. 1) and display respective content on a display device (e.g., element 8 of FIG. 1), as known in the art.

As shown in FIG. 2, system 100 may be divided to a first subsystem 110, that may include scheme editor 40 and may be configured to produce scheme 30 as explained above, and a second subsystem 120, configured to interpret the scheme and present and/or store the at least one WPC on a web browser 70 or server 90. According to some embodiments, subsystems 110 and 120 may be implemented as separate software modules and may be executed on separate computing devices (e.g., separate instantiations of element 1 of FIG. 1). Accordingly, scheme 30 may be migrated or transferred from a first web page 60 that may be designed by a first user on a first computing device and may be integrated into a second web page 60 that may be designed by a second user on a second computing device, as elaborated herein.

Figure 3:
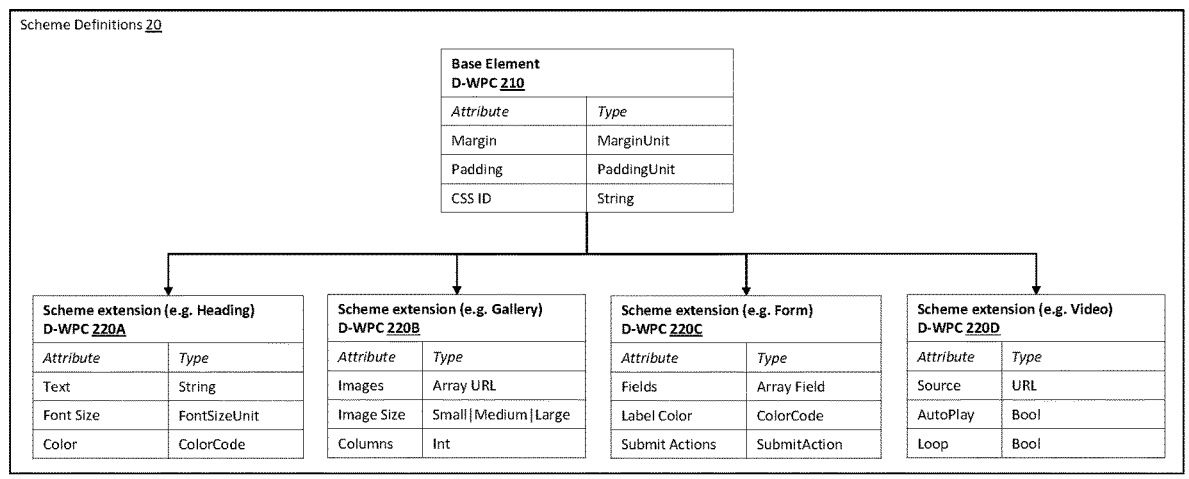
FIG. 3 is a block diagram, depicting an example of a scheme definition, that may be used by a system for creation of modular web pages, according to some embodiments.

Reference is now made to FIG. 3, which is a block diagram depicting an example of a scheme definition 20, that may be used by a system for creation of transferrable, modular web pages, according to some embodiments. The scheme definition may include one or more definitions of a WPC (hereinafter D-WPC), including for example a heading object, a text object, a form object, an image object, an image gallery object, a video object, a table object and the like.

As shown in FIG. 3, the scheme definition 20 may be implemented as a hierarchical structure, including at least one base or parent D-WPC 210, and respective one or more child or extension D-WPCs 220 (e.g., 220A, 220B, 220C, 220D), adapted to inherit at least one attribute of parent D-WPC 210, as known in the art.

For example, a base element D-WPC 210 may include or represent a text object that may be configured to be presented or displayed by a web browser. A respective extension or child element D-WPC 220 (e.g., 220A, 220B, 220C, 220D) may include, for example, a text object that may inherit at least one attribute (e.g., a font type) of the base D-WPC element 210. Additionally, or alternatively, the extension or child element D-WPC 220 may include an additional attribute (e.g., an animation attribute, such as appearance and disappearance by fade-in and fade-out).

The scheme definition may be implemented as a data structure including one or more tables, such as a relational database, where each table may be associated with a definition of at least one web page component. The scheme definition may be stored as one or more files on a storage device (e.g., element 6 or element 4 of FIG. 1) associated with or included in system 100.

Reference is now made to FIG. 4 which is a block diagram, depicting an example of a scheme instantiation 30, that may be used by a system for creation of modular web pages, according to some embodiments. Scheme instantiation 30 may include one or more instances of scheme web page components (S-WPCs) 310 (e.g., 310A, 310B, 310C, 310D, 310E), according to the respective definitions of the web page components (D-WPCs) in the scheme definition (e.g., element 20 of FIG. 3). In some embodiments, the different fields that are included within S-WPCs 310 of scheme instantiation 30 (e.g., the 'Text' field in element 310A) may be attributed values (e.g., "About us") by a user, e.g., via a user interface (e.g., UI 80 of FIG. 2) or by a software process (e.g. by an application executed by processor element 2 of FIG. 1), as elaborated herein.

Reference is now made to FIG. 5 which is a block diagram, depicting a system 100 for creation of modular web pages, according to some embodiments.

Scheme editor 40 may read at least one WPC definition (D-WPC) 220 from the scheme definitions data structure 20 and may communicate the read data to UI 80. UI 80 may in turn represent at least one available WPC of the one or more WPCs included in scheme definitions data structure 20, as a selectable object (e.g., an icon) on a dedicated section or pane of available elements 810 on UI 80. UI 80 may enable a user to select at least one such selectable object (e.g., 810A, 810B, 810C, 810D).

In some embodiments, UI 80 may enable a user to select and place or locate (e.g., by dragging and dropping) at least one representation (e.g., an icon) of a selectable WPC (e.g., a heading) in a preview region or pane 820 in UI 80, so as to design a web page, or a part thereof that may include the at least one selected WPC (e.g., a heading).

After selecting the at least one representation (e.g., icon) of a selected WPC (e.g., 810A, 810B, 810C, 810D, such as a heading), and placing or locating it in preview pane 820 by the user, scheme editor 40 may create, modify or update a page scheme 30 to include an instantiation of the web page component represented by the selected object, in the unified scheme format (e.g., S-WPC 310). The scheme may include, for example at least one of: a type of the selected WPC (e.g., a heading) the location of the at least one selected object on the preview region (e.g., at the top of the preview pane), and at least one attribute of the respective web page component (e.g., a font size of the heading WPC).

Figure 6:
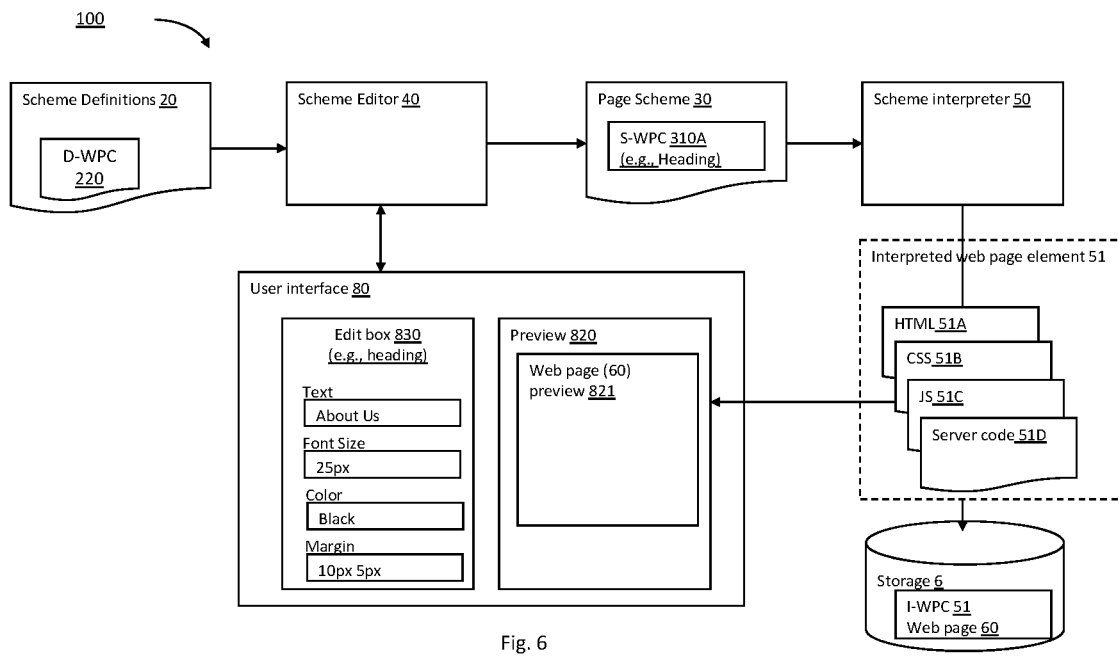
FIG. 6 is a block diagram, depicting a system for creation of modular web pages, according to some embodiments.

Additionally, or alternatively, UI 80 may enable a user to edit or alter at least one attribute of the selected WPC (e.g., change the font of the selected heading WPC) prior to, during or after the placement of the selected WPC in preview pane 820, as elaborated herein (e.g., in relation to FIG. 6). In such an event, scheme editor 40 may modify or update page scheme 30 to include the altered attribute of the web page component S-WPC 310.

The term "interpretation" may be used herein to refer to the action of transforming at least one web page component, in a unified scheme format (e.g., S-WPCs 310), to create at least one subsequent software object or code element that may be adapted to define or implement at least one aspect of a web page component on a target web page (e.g., element 60). In other words, scheme interpreter 50 may be configured to interpret the unified scheme format of one or more instantiations of web page components (e.g., S-WPC 310) in page scheme 30 to at least one respective appropriate format for presentation and/or execution on a target web page (e.g., element 60).

Interpreter 50 may create one or more interpreted web page components (I-WPCs) 51 that may include one or more objects or elements of instruction code (e.g., 51A, 51B, 51C). For example, the one or more elements of instruction code may include: an HTML instruction code element 51A, a CSS instruction code element 51B, a JavaScript instruction code element 51C, and one or more server code elements 51D in an appropriate format (e.g., in JavaScript syntax). As known to persons skilled in the art, HTML instruction code 51A may define a structure of the web page component, CSS instruction code 51B may define a styling of the web page component and JavaScript instruction code 51C may define a functionality of the web page component.

UI 80 may receive the at least one interpreted web page component I-WPC 51, including the at least one object of instruction code (e.g., 51A, 51B, 51C) from interpreter 50 and may present the respective one or more web page components 51 modules or components of a web page 60 on a preview region 820, as known to persons skilled in the art.

For example, UI 80 may present the one or more web page components according to at least one of: (a) the web page components' appropriate, interpreted formats (e.g., HTML, CSS and JavaScript, in the example depicted in FIG. 5); (b) the web page components' respective attributes (e.g., font size and style); and (c) the location of respective representing objects (e.g., icons) placed by the user on the preview region 820 of UI 80.

According to some embodiments, UI 80 may include or may be implemented as a web browser, adapted to present or display the one or more web page components according to the content of the one or more objects of instruction code (e.g., 51A, 51B, 51C) as known in the art. Alternatively or additionally, scheme 30 may be migrated to a subsystem (e.g., to element 120, as depicted in FIG. 2) that may include a scheme interpreter 50. Interpreter 50 of system 120 may produce at least one interpreted web page component (I-WPC), including at least one element or object of instruction code (e.g., 51A, 51B, 51C) to include and/or present at least one WPC as a component or a module of a web page 60 on web browser 70 of system 120.

Alternatively or additionally, interpreter 50 of system 120 may produce at least one object of instruction code 51D in an appropriate format (e.g., a JavaScript syntax and/or a textual description of an action) to be executed on a computing device (e.g., element 1 of FIG. 1), such as a server (e.g., element 90 of FIG. 2) that may be included in or associated with system 120. For example, interpreter 50 may produce a server instruction code 51D that may include at least one object of instruction code that may facilitate sending an email from server 90 to a predefined address.

In some embodiment, at least one interpreted web page component (I-WPC) 51 may be stored in a storage device (e.g., element 6) that may be associated with system 100. Additionally, or alternatively, at least one web page 60 may include one or more modules or components of I-WPCs 51 that may be stored on storage device 6 and may be sent or migrated as one or more modular web pages 60.

Reference is now made to FIG. 6 which is a block diagram, depicting a system for creation of modular web pages 60, according to some embodiments.

As shown in FIG. 6, UI 80 may display one or more attributes associated with at least one web page component D-WPC 220 (e.g., a heading) of the scheme definitions set 20 on an editing region or edit box 830. UI 80 may enable a user to select at least one WPC (e.g., the heading) and edit a value of at least one attribute of the at least one web page component (e.g., the value of the text of the heading: "About us") in edit box 830.

Following such edit or alteration of a value (e.g., "About us") of an attribute (e.g., text) of the selected WPC (e.g., heading) by a user of UI 80, scheme editor 40 may modify or update page scheme 30 accordingly, to include an updated or altered scheme web page component (e.g., S-WPC 310A). Scheme interpreter 50 may, in turn, produce at least one updated instruction code element (e.g., 51A, 51B, 51C) that may include the altered attribute value, and UI 80 may then present the altered WPC in preview region 820.

Figure 7:
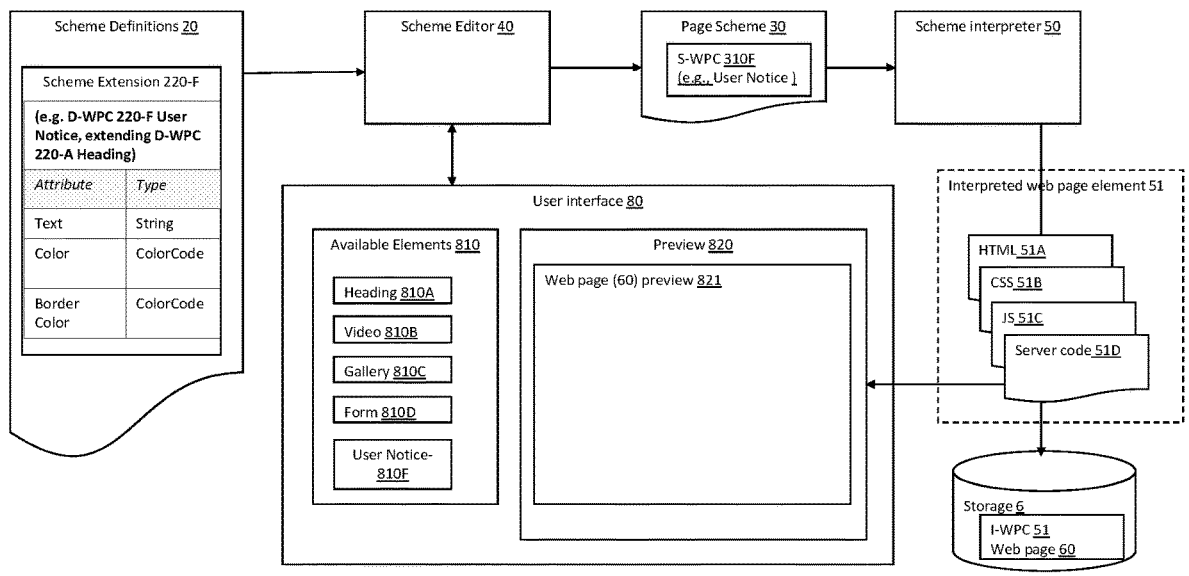
FIG. 7 is a block diagram, depicting a system for creation of modular web pages, according to some embodiments.

Reference is now made to FIG. 7 which is a block diagram, depicting a system for creation of modular web pages 60, according to some embodiments. As shown in FIG. 7, scheme 30 may be extended to include at least one new child WPC (e.g., S-WPC 310F), that may inherit at least one attribute of at least one respective parent WPC. Such an extension may be applicable, for example, to a web page that may be designed and displayed or presented on UI 80 by a user and may not require alteration or extension of an instruction code of the scheme editor 40 and/or interpreter 50.

For example, system 100 may receive a definitions set 20 that may include one or more definitions of parent web page components D-WPC 220, where each such parent web page component may be associated with one or more respective parent attributes. In the example depicted in FIG. 7, the one or more parent WPC may be a heading, having attributes as depicted in element 220A of FIG. 3 (e.g., text, font size and color).

UI 80 may be configured to enable a user to produce a child web page component (e.g., a "user notice" element, D-WPC 220-F), associated with one or more respective child attributes. The one or more child attributes may include or inherit the one or more parent attributes of the one or more parent web page components (e.g., heading D-WPC 220-A of FIG. 3).

Editor 40 may extend definitions set 20 to include the new child WPC (e.g., "user notice"), that may inherit (e.g., have the same attribute values that may be defined for its parent WPC) at least one attribute of its respective parent WPC (e.g., heading). In addition, as shown in FIG. 7, the child element (e.g., "user notice", 220-F) may have at least one additional attribute (e.g., "border color").

Editor 40 may consequently present the child WPC (e.g., "user notice", 220-F) on an available elements pane 810 of UI 80. A user may place a representation (e.g., an icon) of the new child WPC in preview 820, and editor 40 may produce a scheme, 30 that may include one or more instantiations of the child web page component 220-F, in a unified scheme format S-WPC 310F, as elaborated herein.

Interpreter 50 may, in turn, produce at least one interpreted web page component I-WPC 51 that may include at least one instruction code object or element (e.g., MA, 51B, 51C) defining the new child WPC (e.g., 220-F), and preview pane 820 of UI 80 may consequently presented the child WPC (e.g., "user notice", 220-F) as elaborated herein.

Figure 8:
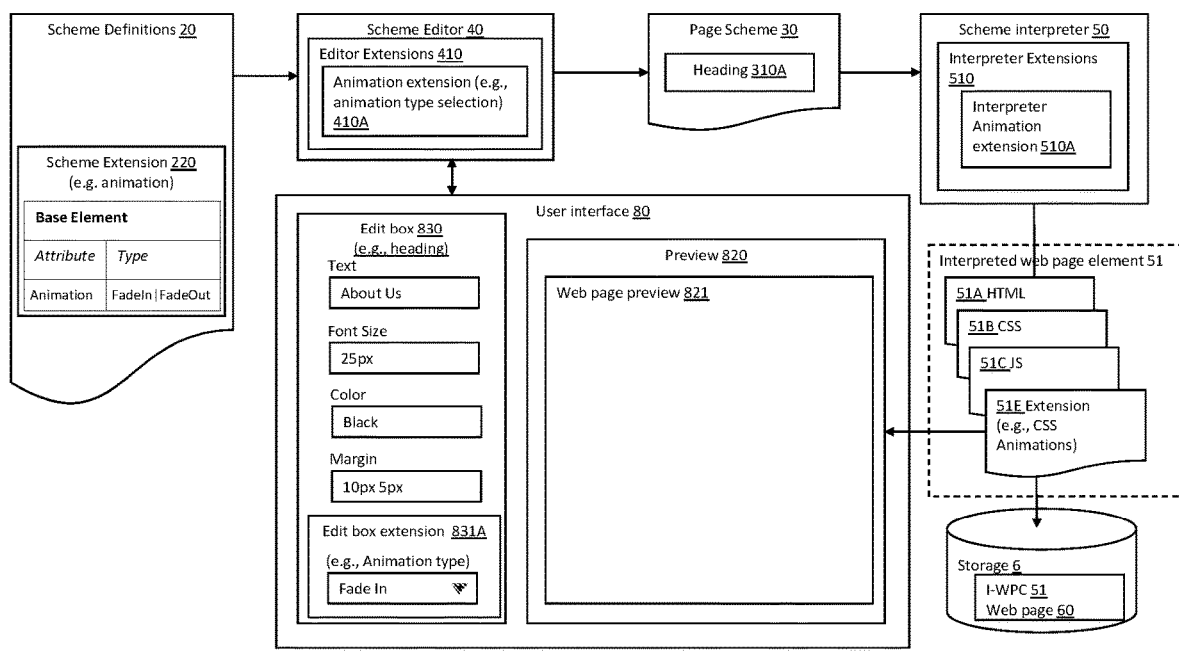
FIG. 8 is a block diagram, depicting a system for creation of modular web pages, according to some embodiments.

Reference is now made to FIG. 8 which is a block diagram, depicting a system for creation of modular web pages 60, according to some embodiments. As shown in the example depicted in FIG. 8, in order to introduce new attributes to existing WPCs, respective code extensions may be added to scheme editor 40 and to interpreter 50.

For example, a user may require presenting a web page component (e.g., a heading) by animating it (e.g., fading the heading in and out of presentation). Editor 40 may be extended by adding an extension 410A that would present (e.g., in edit box 830 of UI 80) a selection dialog 831A (e.g., a dropdown box or any other appropriate interface known in the art), to enable selection of animation types and/or animation definitions by the user.

Interpreter 50 may be extended by adding an extension 510A that may be configured to interpret the selected animation types and/or animation definitions to at least one object of an instruction code (e.g., MA, 51B, 51C, 51E). For example, instruction code element 51E may be a CSS instruction code element, adapted to present and/or render the selected animated heading on preview pane 820 and/or on a web browser (e.g. element 70 of FIG. 2).

Figure 9A:
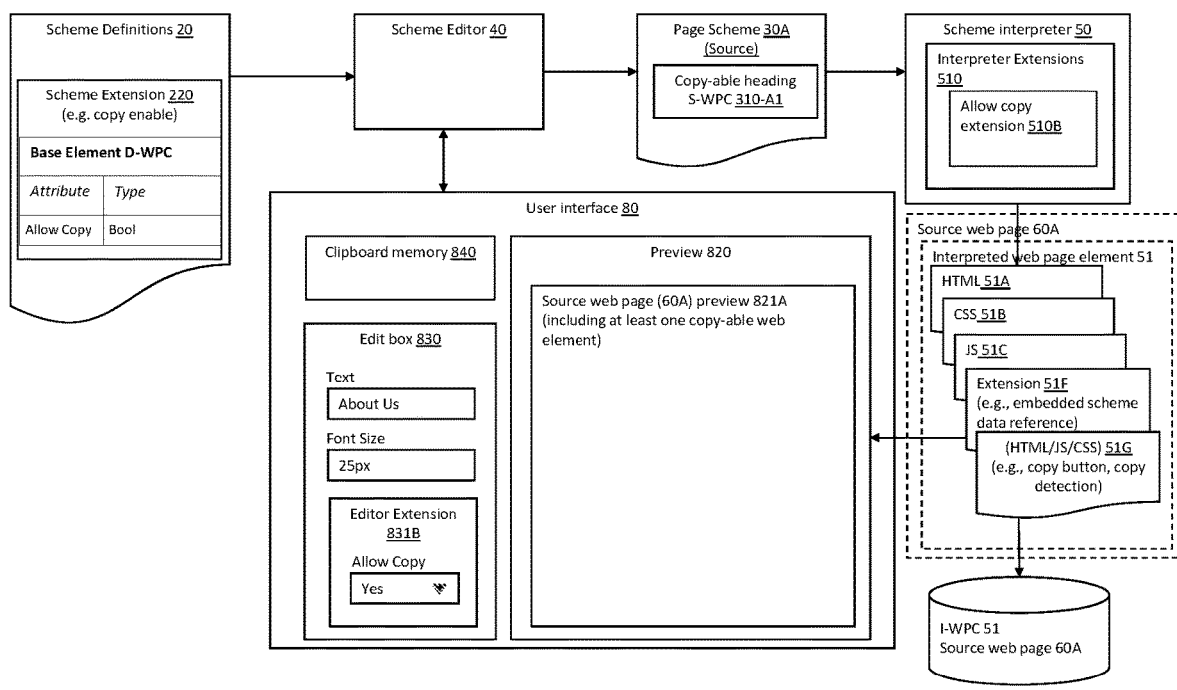
FIGS. 9A and 9B are block diagrams, jointly depicting a system for creation of modular web pages, according to some embodiments.
Figure 9B:
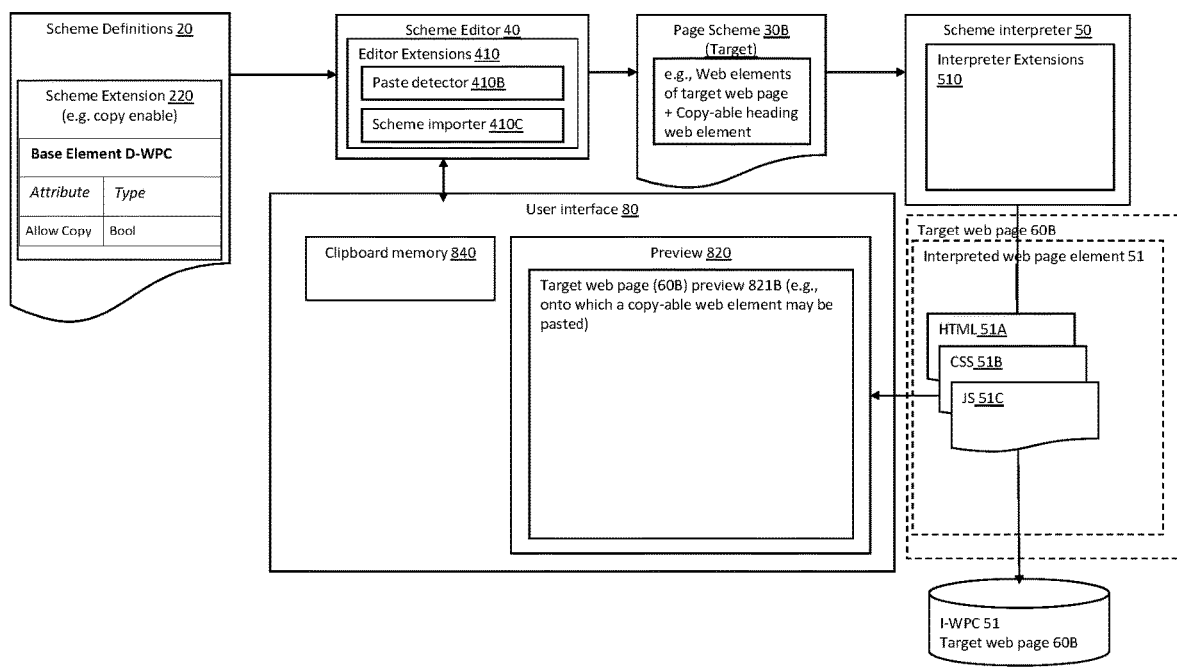

Reference is now made to FIG. 9A and FIG. 9B which are block diagrams, jointly depicting a system for creation of modular web pages, according to some embodiments. FIG. 9A depicts creation of a web page component that may be copied, migrated or transferred from a source web page 60 (e.g., 60A). FIG. 9B depicts an integration or pasting of the transferred or copied WPC onto a target web page 60 (e.g., 60B).

As shown in FIG. 9A and FIG. 9B, scheme definitions 20, editor 40 and interpreter 50 may be extended to facilitate migration (e.g., copying and pasting elements on UI 80) of at least one WPC from source web page 60A (e.g., a template, third-party web page) on UI 80 or a web browser (e.g., element 70 of FIG. 2) to target web page 60B (e.g., a page that may currently be designed by a web page designer) on UI 80.

Source web page 60A may be imported (e.g., copied or downloaded) from a remote computing device and/or stored in a storage device (e.g., element 6 of FIG. 1) associated with or communicatively connected to system 100. Source web page 60A may be or may include at least one WPC that may be defined as copy-enabled, as explained herein, and may be represented by a scheme web page component (e.g., S-WPC 310-A1) within a respective source scheme 30A.

Source scheme 30A may include at least one scheme web page component (e.g., S-WPC 310-A1) that may be migrated (e.g., copied) and integrated (e.g., pasted) within a target web page 60B, that may be represented by a target scheme 30B, as elaborated herein.

As shown in FIG. 9A, a user may extend (e.g., via UI 80) scheme definitions data object 20 to include a "copy-enable" definition of a base web page component (D-WPC) 220. For example, D-WPC 220 may include an "allow copy" attribute (e.g., a Boolean attribute, where a 'true' value may represent a "copy-enabled" data object 20, and a 'false' value may represent a "copy-disabled" data object). At least one web page component (e.g., a heading) of scheme definitions 20 may be configured to inherit the "allow copy" attribute, thus marking instantiations of the WPC (e.g., heading S-WPC 310-A1) in source scheme 30A as copy-enabled. This may enable a user to assign a copy enablement attribute to at least one web page component. Scheme editor 40 may produce, or update source scheme 30A to include an instantiation of the at least one copy-enabled WPC (e.g., heading S-WPC 310-A1) in the unified scheme format, as explained herein (e.g., in relation to FIG. 2).

A user may include the copy-enabled WPC (e.g., 310-A1) in a design or code of a source web page 60A, using the preview pane 820 of UI 80. Scheme interpreter 50 may interpret at least one scheme web page component (e.g., S-WPC 310-A1) to produce source web page 60A that may include at least one interpreted web page component (e.g., I-WPC 51). The at least one interpreted web page component (e.g., I-WPC 51) may include at least one instruction code object (e.g., MA, 51B, 51C), as explained above.

According to some embodiments, scheme interpreter 50 may be extended to include an "allow copy" extension 510B. Extension 510B may be configured to create a first instruction code object 51F (e.g. an HTML instruction code) for at least one copy-enabled WPC. Extension 510B may embed or insert in instruction code object 51D at least one portion of source scheme 30A relating to the copy-enabled WPC (e.g., a copy-enabled heading web page component), in the unified scheme format. Alternatively, extension 510B may embed in instruction code object 51F a link and/or a reference or pointer to source scheme 30A.

Thus, modular source web page 60A may include at least one embedded or referenced element of a scheme pertaining to the copy-enabled WPC. When a user copies a copy-enabled WPC from source web page 60A (e.g., by selecting the copy-enabled WPC and pressing the Control+'C.' buttons), instruction code object 51F may include and/or refer to data of the copy-enabled WPC of source web page 60A. This data may include, for example: structural-related data (e.g., in HTML format), styling-related data (e.g., in CSS format), functional or operational-related data (e.g., in JavaScript format), and server-side instructions data (e.g., in HTML and/or in JavaScript format).

According to some embodiments, if a user attempts to copy a web page component of source web page 60A, that is not attributed as copy-enabled, extension 510B may refrain from embedding data pertaining to the web page component in instruction code element 51F and may thus prevent copying the web page component.

According to some embodiments, extension 510B may be further configured to create a second instruction code object 51G such as a 'copy' instruction code element, that may be implemented in any appropriate coding language or format (e.g., a JavaScript instruction code object). Extension 510B may create the copy instruction code element based on the copy enablement attribute (e.g., only if a value of the copy enablement attribute is 'true'). The copy instruction code element may handle copying of a copy-enabled web page component from source web page 60A. For example, instruction code object 51G may produce a 'Copy' button on source web page 60A, and may associate the button with the relevant copy-enabled WPC on source web page 60A. Instruction code object 51G may be further configured to detect a click on the copy button or a copy command input (e.g. via a keyboard), and consequently copy scheme 30A or a portion thereof relating to the relevant copy-enabled web page component (e.g., S-WPC 310-A1, as embedded in element 51F) of the source web page to a memory location (e.g. a clipboard memory 840) associated with UI 80 or with web page 60A. This may enable a user to later 'paste' the copy-enabled web page component (e.g., S-WPC 310-A1) onto a target web page 60B, as elaborated herein.

In some embodiments, a user may receive or import (e.g., via UI 80) at least one file that may include source web page 60A from a first computing device to a second computing device. Source web page 60A may include at least one copy-enabled WPC 51, and a respective at least one source scheme 30A (e.g., embedded in element 51F or included as a reference in element 51F), including at least one instantiation of the copy-enabled web page component (e.g., S-WPC 310-A1).

For example, the at least one source scheme 30A may be embedded or inserted within at least one instruction code object (e.g., 51A, 51B, 51C, 51F) of source web page 60A, as elaborated above. UI 80 may be configured to recognize or detect a copy action (e.g., a user pressing the Control+'C.' buttons, or another user input) corresponding or pertaining to the copy-enabled web page component 51 from source web page 60A and may consequently store the content of the embedded source scheme (e.g., embedded in 51F or included as a reference in 51F) in a memory (e.g., a cache memory) that may be associated with UI 80 of the second computing device.

According to some embodiments, an instantiation of at least one source WPC (e.g., S-WPC 310-A1) may be associated with a copy-enablement WPC attribute, and UI 80 may store the embedded source scheme (e.g., included in element 51F or referred to by element 51F) according to a value of the copy-enablement WPC attribute. For example, if a value of the copy-enablement WPC attribute is 'true' (e.g., "copy-enabled"), then UI 80 may store one or more data elements pertaining to the embedded or referenced source scheme (e.g., 51F) in a local or remote cache memory (e.g., element 4 of FIG. 1) associated with the web page. In a complementary manner, if the value of the copy-enablement WPC attribute is 'false' (e.g., "copy-disabled"), then UI 80 may refrain from storing the one or more data elements (e.g., 51F) in the cache memory.

As shown in FIG. 9B, a user may produce or design a target web page 60B, by using UI 80. The target web page 60B may be produced and/or stored on the same computing device (e.g., element 1 of FIG. 1) as the source web page 60A, or on another computing device.

Scheme editor 40 may be extended to include a paste detection extension 410B, configured to identify or detect a paste action (e.g., pressing the Control+'V' buttons or another input) that may be performed by the user. For example, a user may paste a web page component associated with source scheme 30A (e.g., as included in embedded scheme element 51F, or referred or pointed by element 51F), that may have been copied to a memory associated with UI 80 or web page 60A (e.g., from clipboard memory 840 of UI 80) onto a preview 820 of the target web page 60B on UI 80.

Extension 410B may detect whether the pasted data is indeed a scheme of a copy-enabled web page component (e.g., S-WPC 310-A1). If so, then editor 40 may update target web page 60B by adding the pasted scheme 30A (e.g., as included in embedded element 51F and/or referred or pointed by element 51F) to target scheme 30B, thus incorporating the structural, styling, and operational data of a copy-enabled web page component 51 of source web page 60A to target web page 60B.

Interpreter 50 may consequently produce an updated target web page 60B, that may include the pasted WPC according to the interpretation of the updated target scheme. Target web page 60B may subsequently be rendered and/or presented by UI 80 and/or by a web browser (e.g., element 70 of FIG. 2).

According to some embodiments, interpreter 50 may be configured to merge two or more definitions of web page components into a unified scheme format (S-WPCs). For example, a first S-WPC may be included in a first scheme data object (e.g., element 30 of FIG. 5) and may be associated with a first web page component (e.g., a text object), and a second S-WPC may be included in a second scheme data object 30 and may be associated with a second web page component (e.g., background image).

In some embodiments, the first S-WPC may be associated with at least one default definition of a web page (e.g., 60A, 60B) and the second S-WPC may be associated with a copy-enabled WPC of a source web page 60A. Interpreter 50 may be configured to merge between attributes of the first WPC and second WPC so as to enable a user to seamlessly embed the copy-enabled WPC in target web page 60B (e.g., render the text box with the default background image) by simply 'copying' (e.g., CTRL+'C.') and 'pasting' (e.g., CTRL+'V') the copy-enabled WPC, as elaborated herein.

It may be appreciated by a person skilled in the art that copying and pasting content of schemes (in the unified scheme format) may thus facilitate transferal of instantiations of WPCs or modules (e.g., buttons, forms, text boxes, images etc.) from a source web page to a target web page. Furthermore, this transferal may not be limited or dependent upon any specific web domain. For example, the source web page may be included in or associated with a first web domain (e.g., www.first_domain.com) and the target web page may be included in or associated with a second, different web domain (e.g., www.second_domain.com).

Reference is now made to FIG. 10, which is a block diagram depicting an example of merging or combining respective instantiations of web page components (S-WPCs) by interpreter 50. As shown in FIG. 10, interpreter 50 may merge the fields of specific, copy-enabled S-WPC instantiations (as defined in page scheme 30-A2) with default values of source page 60A (as defined in page scheme 30-A1). The result of this merge may be a third page scheme, 30-A3, that may include one or more merged instantiations of web page components (S-WPCs).

According to some embodiments, interpreter 50 may be configured to detect a user's attempt to copy a copy-enabled WPC (e.g., by pressing the Control+'C.' buttons, by a copy action on UI 80, by a copy action on web browser 70 and/or by another user input), associated with an instantiation of a WPC in page scheme 30-A2 (e.g., S-WPC 310-A2). Interpreter 50 may merge the content of the scheme S-WPC 310-A2 with an instantiation of a respective default value of the WPC on source page 60A (e.g., S-WPC 310-A1), to produce a merged instantiation (e.g., S-WPC 310-A3) of the WPC as shown in FIG. 10. Interpreter 50 may produce at least one interpreted WPC (e.g., element I-WPC 51 of FIG. 9A) as elaborated above, to render and/or display the merged WPC on UI 80 and/or store the I-WPC on a storage device.

According to some embodiments, in case of a contradiction between a value in a field of a first scheme instantiation (e.g., S-WPC 310-A2) associated with a copy-enabled WPC and a value in a field of a second scheme instantiation (e.g., S-WPC 310-A1) associated with a default value of source web page 60A, interpreter 50 may be configured to perform at least one of:

set the value of the respective field of S-WPC 310-A3 according to S-WPC 310-A1 (e.g., ignore the configuration of the copy-enabled WPC);

set the value of the respective field of S-WPC 310-A3 according to S-WPC 310-A2 (override the default value); or prompt (e.g., in UI 80) the user to select between the default value (e.g., in S-WPC 310-A1) and the copied WPC (e.g., in S-WPC 310-A2).

According to some embodiments, interpreter 50 may be configured to merge between two or more instantiations of web page components in a unified scheme format (S-WPCs), where at least one S-WPC is associated with at least one WPC of a source web page (e.g., element 60A of FIG. 9A), and at least one S-WPC is associated with at least one web page component of a target web page (e.g., element 60B of FIG. 9B). For example, interpreter 50 may be configured to merge between a first instantiation (S-WPC) of a copy-enabled WPC in a unified scheme format associated with a source web page 60A and a second instantiation (S-WPC) associated with default values of a target web page 60B.

Reference is now made to FIG. 11 which is a block diagram depicting an example of merging or combining respective instantiations of web page components (S-WPCs) by interpreter 50.

As discussed above, interpreter 50 may merge the fields of specific, copy-enabled S-WPC instantiations (as defined in page scheme 30-A2) with default values of source page 60A (as defined in page scheme 30-A1). In addition, interpreter 50 may merge the fields of specific, copy-enabled S-WPC instantiations, as defined in page scheme 30-A2, with default values of target page 60B as defined in page scheme 30-B4 (e.g., after pasting a copy-enabled WPC on preview section 820 of UI 80).

According to some embodiments, a user may perform a copy operation on a copy-enabled WPC on a source page 60A. For example, the user may select the WPC (e.g., by clicking a mouse button on the WPC's location on source web page 60A) and copy the selected WPC (e.g., by pressing the Control+'C.' buttons). An extension of interpreter 50 (e.g., extension 510B, as described above in relation to FIG. 9A) may identify the copy attempt, and may copy at least one instantiation associated with the copy-enabled WPC (e.g., S-WPC 310-A2) and/or an instantiation associated with default values of the source web page (e.g., S-WPC 310-A1) to a memory module (e.g., element 4 or element 6 of FIG. 1).

Scheme editor 40 may be configured to identify or detect a paste action (e.g., pressing the Control+'V' buttons) that may be performed by the user, as explained herein (e.g., in relation to FIG. 9B). For example, a user may paste a WPC associated with source page 60A onto a preview 820 of the target web page 60B on UI 80. Scheme editor 40 may update target web page 60B by adding the at least one instantiation (e.g., S-WPC 310-A1 and/or S-WPC 310-A2) of the pasted web page component of the source scheme 30A to target scheme 30B, thus incorporating the structural, styling, and operational data of a copy-enabled WPC 51 of source web page 60A to target web page 60B.

As shown in FIG. 11, interpreter 50 may merge fields of the pasted, copy-enabled WPC (e.g., S-WPC 310-A2) with respective fields of source default values (e.g., S-WPC 310-A1) and/or target default values (e.g., S-WPC 310-A4), to produce a merged instantiation of a WPC in a unified scheme format (e.g., S-WPC 310-A5).

Interpreter 50 may consequently produce an updated target web page 60B, as elaborated herein (e.g., in relation to FIG. 9B). Target web page 60B may include the pasted web page component, with attributes that are may be merged among a plurality of schemes (e.g., 30-A1, 30-A2, 30-B4 and 30-B5).

Reference is now made to FIG. 12, depicting a system for creation of modular web pages, according to some embodiments. According to some embodiments, at least one instantiation (e.g., element S-WPC 310A) of a web page component in a page scheme data object (e.g., element 30) may include at least one dynamic field. The term 'dynamic' may refer, in this context, to a field or parameter that may define a property of a WPC, and of which the value may be dynamically configured (e.g., by a user and/or a standard data structure, as explained herein), rather than preset at the time of creating the web page.

In some embodiments, a user may extend (e.g., via UI 80) scheme definitions data object 20 to include a "dynamic values" definition of a base web page component (D-WPC) 210. D-WPC 210 may include at least one dynamic attribute (e.g., a "site name" and a "site logo", as shown if FIG. 12). At least one web page component (e.g., a heading) of scheme definitions 20 may be configured to inherit the "dynamic values" attributes, thus marking instantiations of the web page component (e.g., heading S-WPC 310-A) in page scheme 30A as having dynamic attributes.

Interpreter 50 may include a "dynamic values interpreter" extension MOD, configured to obtain data relating to the dynamic fields and produce at least one interpreted web page component (I-WPC) 51 dynamically, according to the obtained data.

For example, as depicted in FIG. 12, scheme definition 20 may include a "dynamic values" extension 210. The dynamic values extension 210 may include the site name and logo as dynamic values. This means that a first web page 60C associated with a first company may need to display a first name and logo, and a second web page 60D associated with a second company may need to display a second name and logo. Interpreter extension 510D may be configured to obtain the required values of dynamic fields (e.g., the name and logo) from a database (e.g., by querying the first name and logo values from a first database associated with the first company and querying the second name and logo values from a second database associated with the second company).

Reference is made to FIG. 13, depicting an example of a scheme including a plurality of dynamic fields, and may be included in system 100 according to some embodiments.

According to some embodiments, a user may copy at least one copy-enabled WPC from a source web page 60A, as elaborated herein (e.g., in relation to FIG. 9A). Interpreter 50 may copy at least one S-WPC to a memory module associated with UI 80 and/or the source web page 60A. Interpreter 50 may be configured to include the obtained dynamic data (e.g. the site name and/or logo) in respective fields of the S-WPC.

A user may choose to paste the copied at least one WPC into a target web page 60B, as elaborated herein (e.g., in relation to FIG. 9B). According to some embodiments, editor 40 may include at least one extension 410D associated with at least one dynamic value. Editor extension 410D may be configured to determine at least one characteristic of the pasting of a WPC that includes a dynamic value. For example, editor extension 410D may prompt (e.g., on UI 80) the user whether to accept the obtained dynamic value (e.g., site name), whether to replace it with another value (e.g., as selected by a user), whether to present a default value in its place, and the like.

Figure 14:
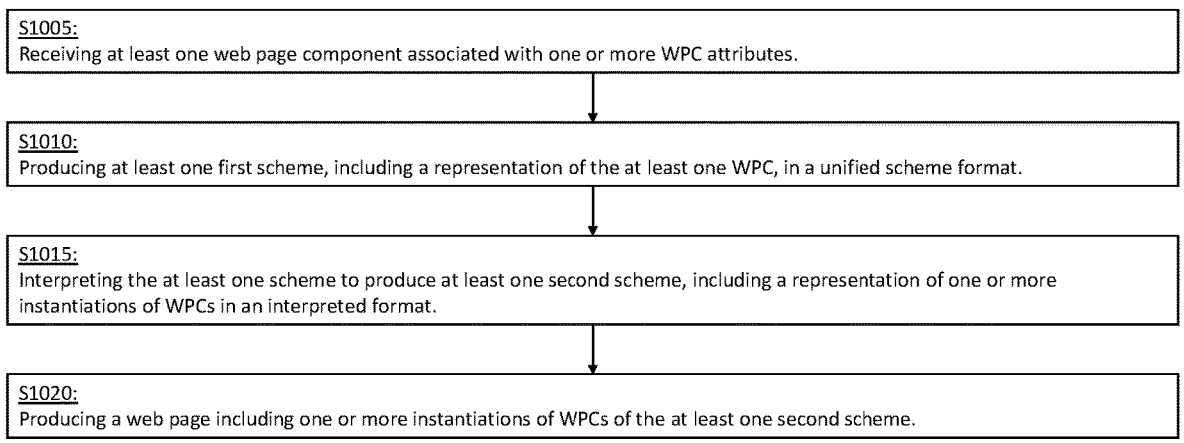
FIG. 14 is a flow diagram, depicting a method of producing a web page by at least one processor.

Reference is now made to FIG. 14 which is a flow diagram, depicting a method of producing a web page by at least one processor or controller.

As shown in step S1005, the at least one processor or controller (e.g., element 2 of FIG. 1) may receive at least one web page component (e.g., element 40A of FIG. 2 such as a video, an image, a text box, a form, and the like) that may be associated with one or more WPC attributes (e.g., a size, a font, a location on a web page and the like). For example, a scheme editor module (e.g., element 40 of FIG. 2) may be implemented by the at least one processor. As elaborated herein (e.g., in relation to FIG. 2), scheme editor module 40 may receive (e.g., from UI element 80 of FIG. 2, from input element 7 of FIG. 1 and the like) at least one scheme definition 20 that may include at least one WPC definition D-WPC (e.g., element 210 of FIG. 2). As elaborated herein (e.g., in relation to FIG. 2, FIG. 3 and/or FIG. 4), editor module 40 may assign one or values to attributes of D-WPC to produce an instantiation of a WPC 40A. Additionally, or alternatively, the one or more processors 2 may receive the instantiation of the WPC 40A from a user interface (e.g., UI element 80 of FIG. 2) and/or via an input device or element (e.g., element 7 of FIG. 1).

As shown in step S1010, the at least one processor or controller 2 may produce at least one first scheme, comprising a representation of the at least one WPC, in a unified scheme format (e.g., element S-WPC 310 of FIG. 2);

As shown in step S1015, and as elaborated herein (e.g., in relation to FIG. 2) the at least one processor or controller 2 may interpret (e.g., by scheme interpreter module 50 of FIG. 2) the at least one scheme S-WPC 310 to produce at least one second scheme I-WPC 51, that may include a representation of one or more instantiations of WPCs in an interpreted format. The one or more instantiations of WPCs in an interpreted format may include a plurality of code elements in respective appropriate format and/or syntax (e.g., elements 51A through 51G as elaborated herein).

As shown in step S1020, the at least one processor or controller 2 may produce a web page (e.g., element 60 of FIG. 2) that may include one or more instantiations of WPCs of the at least one second scheme. For example, web page 60 may be a modular web page that may include one or more modules that are transferrable, copy-able web page components, as elaborated herein.

Embodiments of the invention may include practical application of designing web pages in a seamless and effortless manner (e.g., by copying and pasting modules of web page components), as elaborated herein.

As known to persons skilled in the art, web pages typically include one or more web page components that may be characterized by presentation (e.g., location, size, color, etc.) and functionality (e.g., hyperlinks, server-side code, etc.) attributes.

Such web page components are normally associated with a context of a plurality of local elements, including the content of the web page, configuration of a web browser displaying the web page and/or a computing system executing or displaying the web page. Furthermore, web page components are normally defined or described by a plurality of code elements (e.g., HTML, CSS and JavaScript code elements), each having a different format and may be dispersed (e.g., reside in different locations) and/or inseparable from definition of other web page components. Such dispersed constellation renders the re-use of web page components (e.g., by copying a web page component) among different web pages unfeasible.

Embodiments of the present invention present an improvement over existing technology, for example by providing a system and methods for creating web pages that include modules of web page components (WPCs), each being encapsulated (e.g., including all the information required to present and execute the WPC) and transferrable (e.g., by basic copy and paste actions) between different web pages and/or among different computing systems.

Furthermore, embodiments of the present invention provide methods for integrating between different web page components in a streamlined manner. For example, embodiments may enable users to copy (e.g., by simply pressing the Control+'C.' buttons) a WPC (e.g., including all the information required to present and execute the WPC) from a source web page having a first set of default definitions, and paste (e.g., by simply pressing the Control+'V' buttons) the WPC onto a target web page, having a second set of default definitions, so as to implement the second set of default definitions on the presentation and/or functionality of the pasted WPC. Embodiments may further obtain data relating to dynamic WPC fields and produce at least one web page component dynamically, according to the obtained data, to further streamline the integration of imported WPCs from a source web page to a target web page.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method of producing a web page by at least one processor, the method comprising:
    receiving one or more source web page components (WPCs), each comprising a plurality of instruction code elements in a respective plurality of syntaxes, wherein each instruction code element defines one of an appearance of the source WPC, a styling of the source WPC, a functionality of the source WPC, and at least one server-side instruction;
    producing at least one source scheme data element, comprising information of the plurality of instruction code elements of a source WPC the one or more source WPCs, as a single instruction code element, having a single code syntax;
    creating a source web page, by using the one or more source WPCs as modules in the source web page; and
    embedding the at least one source scheme data element, or a reference to the at least one source scheme data element in the source web page.

2. The method of claim 1, further comprising:
    detecting an action of copying the source WPC from the source web page to a target web page;
    transferring the embedded or referenced source scheme data element of the source WPC from the source web page to the target web page;
    interpreting the transferred source scheme data element to produce a respective target WPC, comprising one or more instruction code elements in appropriate syntax, and
    integrating the one or more instruction code elements of the target WPC into the target web page.

3. The method of claim 2, wherein transferring the source scheme data element comprises:
    detecting a copy action corresponding to the source WPC;
    retrieving the source scheme data element;
    detecting a paste action corresponding to the source WPC;
    updating at least one target scheme, associated with the target web page, to comprise one or more instruction code elements of the source scheme data element of the source WPC; and
    interpreting the target scheme to produce an updated target web page, that comprises an instantiation of the copied source WPC.

4. The method of claim 2, further comprising associating a copy-enablement attribute to a source WPC in the source web page, and wherein retrieving the source scheme data element is based on a value of the copy-enablement attribute.

5. The method of claim 2, wherein updating the at least one target scheme further comprises merging fields of the pasted WPC with default values of respective fields of the target web page.

6. The method of claim 2, wherein the plurality of instruction code elements of each target WPC are selected from a list consisting of: an HTML code element, a CSS code element a JavaScript code element and a server-side instruction element.

7. The method of claim 2, wherein interpreting the at least one source scheme comprises disaggregating the second instruction code element, to produce at least one target WPC in an interpreted format, comprising the one or more first instruction code elements, and wherein each of the first instruction code elements has the syntax of the respective original instruction code element.

8. The method of claim 2, wherein interpreting the at least one source scheme further comprises:
obtaining a plurality of WPC attributes, associated with one or more source WPCs of the at least one source scheme;
arbitrating among the plurality of WPC attributes to select at least one WPC attribute; and
producing a target scheme that comprises at least one instantiation of a WPC that is associated with the selected at least one WPC attribute.

9. The method of claim 2, wherein interpreting the at least one source scheme further comprises:
obtaining one or more first WPC attributes, associated with at least one first target WPC;
obtaining one or more second WPC attributes, associated with at least one source WPC of the source scheme;
producing a target scheme that comprises at least one instantiation of a second target WPC, wherein said second target WPC is associated with at least one first WPC attribute and at least one second WPC attribute.

10. The method of claim 2, wherein interpreting the at least one source scheme comprises:
producing at least one target WPC in an interpreted format; and
producing at least one server-side instruction code element associated with the target WPC,
wherein the at least one server-side instruction code element adapted for a specific server computing device.

11. The method according to 10, wherein the at least one server-side instruction code element comprises server instructions in a human language keyword format, and wherein the method further comprise parsing the server instructions of human language to obtain therefrom operational server code in an appropriate server code format.

12. The method of claim 2, wherein at least one source WPC is associated with a dynamic WPC attribute, and wherein interpreting the at least one source scheme comprises:
producing a target WPC in an interpreted format;
associating the target WPC with the dynamic WPC attribute; and
assigning a dynamic value to the dynamic WPC attribute of the target WPC.

13. The method of claim 2, wherein interpreting the at least one source scheme comprises merging the content of the at least one scheme with an instantiation of a default value of the target web page, to produce a merged instantiation of the WPC.

14. The method of claim 2, wherein the source web page is associated with a first web domain, and wherein the target web page is associated with a second, different web domain.

15. The method of claim 1, wherein the WPC is selected from a list consisting of: a heading object, a text object, a form object, an image object, an image gallery object, a video object and a table object, and wherein the WPC attribute is selected from a list consisting of: a color, a size, a location on a web page, a font, a font size, an identification number, a predetermined function attribute and a copy-enablement attribute.

16. The method of claim 15, further comprising:
displaying at least one WPC attribute of at least one instantiation of a WPC on the UI;
receiving, from the UI, a third selection pertaining to modification of a value of the at least one WPC attribute; and
updating the at least one source scheme, to comprise a representation of the instantiation of the WPC according to the third selection, in the single instruction code syntax.

17. The method of claim 1, wherein the source WPC is associated with one or more first instruction code elements, each having a respective, original instruction code syntax, and wherein the source scheme data element comprises a single, second instruction code element, having a single instruction code syntax, and wherein the second instruction code element comprises an aggregation of information pertaining to the one or more first instruction code elements.

18. The method of claim 1, further comprising:
receiving at least one WPC definition associating at least one source WPC with one or more WPC attributes;
representing the at least one source WPC definition as a selectable object on a user interface (UI);
receiving from the UI a first selection of at least one selectable object; and
updating the at least one source scheme, to comprise a representation of an instantiation of the source WPC represented by the selected object, in the single instruction code syntax.

19. The method of claim 18, further comprising:
presenting an instantiation of the source WPC on the UI;
receiving from the UI a second selection pertaining to a location of the instantiation of the source WPC on the UI; and
updating the at least one source scheme, to comprise a representation of the instantiation of the source WPC according to the second selection, in the single instruction code syntax.

20. A system for producing a web page the system comprising: a non-transitory memory device, wherein modules of instruction code are stored, and at least one processor associated with the memory device, and configured to execute the modules of instruction code, whereupon execution of said modules of instruction code, the at least one processor is configured to:
receive one or more source web page components (WPCs), each comprising a plurality of instruction code elements in a respective plurality of syntaxes, wherein each instruction code element defines one of an appearance of the source WPC, a styling of the source WPC, a functionality of the source WPC, and at least one server-side instruction;
produce at least one source scheme data element, comprising information of the plurality of instruction code elements of a source WPC the one or more source WPCs, as a single instruction code element, having a single code syntax;
create a source web page, by using the one or more source WPCs as modules in the source web page; and embed the at least one source scheme data element, or a reference to the at least one source scheme data element in the source web page.

21. A method of producing a web page by at least one processor, the method comprising:
receiving at least one WPC, each comprising a plurality of instruction code elements in a respective plurality of syntaxes, wherein each instruction code element defines one of an appearance of the source WPC, a styling of the source WPC, a functionality of the source WPC, and at least one server-side instruction;
producing at least one first scheme, comprising information of the plurality of instruction code elements of a source WPC the one or more source WPCs, as a single instruction code element, in a unified scheme format;
interpreting the at least one scheme to produce at least one second scheme, comprising a representation of one or more instantiations of WPCs in an interpreted format; and
producing a web page by using one or more instantiations of WPCs of the at least one second scheme.

* * * * *